(12) United States Patent
Hoffman et al.

(10) Patent No.: US 11,817,073 B2
(45) Date of Patent: Nov. 14, 2023

(54) POWER TOOL HAVING NOISE REDUCTION FEATURES

(71) Applicant: TECHTRONIC CORDLESS GP, Anderson, SC (US)

(72) Inventors: Ronald J. Hoffman, Iva, SC (US); Scott W. Reed, Anderson, SC (US); Ashley B. Amick, Jr., Seneca, SC (US)

(73) Assignee: Techtronic Cordless GP, Anderson, SC (US)

( * ) Notice: Subject to any disclaimer, the term of this patent is extended or adjusted under 35 U.S.C. 154(b) by 180 days.

(21) Appl. No.: 17/148,114

(22) Filed: Jan. 13, 2021

(65) Prior Publication Data
US 2021/0225347 A1    Jul. 22, 2021

Related U.S. Application Data

(60) Provisional application No. 62/963,806, filed on Jan. 21, 2020.

(51) Int. Cl.
*G10K 11/162*   (2006.01)

(52) U.S. Cl.
CPC .................. *G10K 11/162* (2013.01)

(58) Field of Classification Search
CPC ..................................... G10K 11/162
USPC .......................................... 181/211
See application file for complete search history.

(56) References Cited

U.S. PATENT DOCUMENTS

| | | | |
|---|---|---|---|
| 3,308,608 A | 3/1967 | Torsten | |
| 4,120,616 A | 10/1978 | Dwyer et al. | |
| 4,269,571 A | 5/1981 | Shikutani et al. | |
| 4,318,203 A | 3/1982 | Satoh et al. | |
| 4,596,921 A | 6/1986 | Hersh et al. | |
| 4,674,146 A | 6/1987 | Tuggle et al. | |
| 4,756,668 A * | 7/1988 | Gassen | F04D 29/703 415/121.2 |
| 4,884,314 A | 12/1989 | Miner et al. | |
| 5,011,058 A | 4/1991 | Sapp et al. | |
| 5,052,073 A | 10/1991 | Iida | |
| 5,195,208 A | 3/1993 | Yamami et al. | |
| 5,211,144 A | 5/1993 | Collins et al. | |
| 5,269,665 A | 12/1993 | Sadler et al. | |
| 5,361,738 A | 11/1994 | Iida | |

(Continued)

FOREIGN PATENT DOCUMENTS

| AU | 2012101710 A4 | 1/2013 |
|---|---|---|
| AU | 2019101084 A4 | 10/2019 |

(Continued)

OTHER PUBLICATIONS

European Search Report for EP Patent Application No. EP21152742 dated May 28, 2021; 2 pages.

(Continued)

*Primary Examiner* — Forrest M Phillips

(74) *Attorney, Agent, or Firm* — Dority & Manning, P.A.

(57) ABSTRACT

A power tool including an air inlet and an inlet muffler disposed within the air inlet, the inlet muffler comprising a plurality of inlet ports, each of the plurality of inlet ports comprising a peripheral surface defining a port aperture therethrough, at least one of the plurality of inlet ports further comprising a damper material provided on the peripheral surface of the at least one inlet port and further defining the port aperture therethrough.

20 Claims, 29 Drawing Sheets

(56) References Cited

U.S. PATENT DOCUMENTS

| | | | |
|---|---|---|---|
| 5,457,846 A | 10/1995 | Kuwano et al. | |
| 5,821,473 A | 10/1998 | Takahashi | |
| 5,841,080 A | 11/1998 | Iida et al. | |
| 5,857,439 A | 1/1999 | Will et al. | |
| 5,926,910 A | 7/1999 | Nishimura et al. | |
| 5,975,862 A | 11/1999 | Arahata et al. | |
| 5,979,013 A | 11/1999 | Beckey et al. | |
| 6,004,093 A | 12/1999 | Ishikawa | |
| 6,077,033 A | 6/2000 | Ishikawa | |
| 6,105,205 A | 8/2000 | Takahashi et al. | |
| 6,105,206 A | 8/2000 | Tokumaru et al. | |
| 6,109,865 A | 8/2000 | Ishikawa | |
| 6,158,082 A | 12/2000 | Beckey et al. | |
| 6,305,048 B1 | 10/2001 | Salisian | |
| 6,324,721 B2 | 12/2001 | D?ragrip | |
| 6,370,729 B2 | 4/2002 | Miyamoto | |
| 6,468,053 B2 | 10/2002 | W?lpert | |
| 6,511,286 B2 | 1/2003 | Miyamoto | |
| 6,514,036 B2 | 2/2003 | Marshall et al. | |
| 6,575,695 B1 | 6/2003 | Miyamoto | |
| 6,637,069 B2 | 10/2003 | Marshall et al. | |
| 6,736,610 B2 | 5/2004 | Cifarelli | |
| 6,755,278 B2 | 6/2004 | Huhn et al. | |
| 6,857,163 B2 | 2/2005 | Iida et al. | |
| 7,055,213 B2 | 6/2006 | Iida et al. | |
| 7,159,691 B2 | 1/2007 | Dahlberg et al. | |
| 7,185,393 B2 | 3/2007 | Dahlberg et al. | |
| 7,293,629 B2 | 11/2007 | Nasuno et al. | |
| 7,300,243 B2 | 11/2007 | Saitou et al. | |
| 7,309,028 B2 | 12/2007 | Langhans et al. | |
| 7,331,759 B1* | 2/2008 | Tejeda | F04D 29/601 416/189 |
| 7,543,725 B2 | 6/2009 | Herzog | |
| 7,698,779 B2 | 4/2010 | Schliemann et al. | |
| 7,721,384 B2 | 5/2010 | Crevling, Jr. et al. | |
| 7,744,342 B2 | 6/2010 | Kamoshita et al. | |
| 7,774,896 B2 | 8/2010 | Andresen et al. | |
| 7,975,652 B2 | 7/2011 | Denison et al. | |
| 7,979,958 B2 | 7/2011 | Raffenberg | |
| 8,032,977 B2 | 10/2011 | Coombs | |
| 8,032,980 B2 | 10/2011 | Basenberg, Jr. et al. | |
| 8,251,644 B2 | 8/2012 | Wada et al. | |
| 8,256,132 B2 | 9/2012 | Gaillard et al. | |
| 8,337,145 B2 | 12/2012 | Frater et al. | |
| 8,397,344 B2 | 3/2013 | Liddell | |
| 8,539,637 B2 | 9/2013 | Basenberg, Jr. et al. | |
| 8,671,508 B2 | 3/2014 | Nagasaka et al. | |
| 8,745,815 B2 | 6/2014 | Takano et al. | |
| 8,756,754 B2 | 6/2014 | Allen et al. | |
| 8,789,237 B2 | 7/2014 | Hatano et al. | |
| 8,893,400 B2 | 11/2014 | Carme | |
| 9,004,854 B2 | 4/2015 | Nakazawa | |
| 9,364,125 B2 | 6/2016 | Takahashi | |
| 9,538,711 B2 | 1/2017 | Mutoh et al. | |
| 9,848,745 B2 | 12/2017 | Hill et al. | |
| 9,850,915 B2 | 12/2017 | Takano | |
| 9,975,235 B2 | 5/2018 | Notaras et al. | |
| 9,980,549 B2 | 5/2018 | Sakuma et al. | |
| 10,117,491 B2 | 11/2018 | Moloney et al. | |
| 10,219,664 B2 | 3/2019 | Lauer | |
| 10,227,988 B2* | 3/2019 | Gao | F04D 29/545 |
| 10,330,116 B2* | 6/2019 | Bylund | F04D 29/522 |
| 2002/0060107 A1 | 5/2002 | Kamoshita et al. | |
| 2003/0039541 A1 | 2/2003 | Wargo | |
| 2006/0196075 A1 | 9/2006 | Santhouse et al. | |
| 2007/0174992 A1 | 8/2007 | Murray et al. | |
| 2007/0294855 A1 | 12/2007 | Iida et al. | |
| 2009/0038106 A1 | 2/2009 | Wada et al. | |
| 2009/0271945 A1 | 11/2009 | Ludwigson | |
| 2010/0000053 A1 | 1/2010 | Moriya et al. | |
| 2010/0064542 A1 | 3/2010 | Mulvaney et al. | |
| 2010/0077755 A1 | 4/2010 | Jangili et al. | |
| 2011/0146023 A1 | 6/2011 | Wada et al. | |
| 2011/0200426 A1 | 8/2011 | Takano | |
| 2013/0061419 A1 | 3/2013 | Patrono et al. | |
| 2013/0183141 A1 | 7/2013 | Tan | |
| 2014/0154106 A1 | 6/2014 | Notaras et al. | |
| 2014/0290087 A1 | 10/2014 | Weatherly | |
| 2014/0328670 A1 | 11/2014 | Lamb | |
| 2015/0201730 A1 | 7/2015 | Carlucci et al. | |
| 2015/0275907 A1* | 10/2015 | Westbrook | F04D 29/526 15/327.2 |
| 2015/0377253 A1 | 12/2015 | Shibata et al. | |
| 2016/0014973 A1 | 1/2016 | Thackery et al. | |
| 2016/0169249 A1 | 6/2016 | Takahashi et al. | |
| 2016/0235178 A1 | 8/2016 | Atkinson et al. | |
| 2016/0238033 A1 | 8/2016 | Fang et al. | |
| 2016/0298635 A1 | 10/2016 | Su et al. | |
| 2016/0305438 A1 | 10/2016 | Yamamoto et al. | |
| 2016/0330913 A1 | 11/2016 | Shao et al. | |
| 2017/0045058 A1 | 2/2017 | Bylund et al. | |
| 2017/0114801 A1 | 4/2017 | Duquette | |
| 2018/0000014 A1 | 1/2018 | Yamaoka et al. | |
| 2018/0094393 A1 | 4/2018 | Takahashi et al. | |
| 2018/0146628 A1 | 5/2018 | Huo et al. | |
| 2018/0163750 A1 | 6/2018 | Landén | |
| 2018/0291930 A1 | 10/2018 | Pellenc | |
| 2019/0021243 A1 | 1/2019 | Naka et al. | |
| 2019/0069737 A1 | 3/2019 | Sakuma et al. | |
| 2019/0069741 A1 | 3/2019 | Murakami et al. | |
| 2019/0069742 A1 | 3/2019 | Sakuma et al. | |

FOREIGN PATENT DOCUMENTS

| | | |
|---|---|---|
| CA | 2934320 C | 8/2017 |
| CN | 1253614 4 | 5/2000 |
| CN | 201822166 U | 5/2011 |
| CN | 202157288 U | 3/2012 |
| CN | 202228435 U | 5/2012 |
| CN | 102525336 A | 7/2012 |
| CN | 202386031 U | 8/2012 |
| CN | 202626912 U | 12/2012 |
| CN | 102852107 A | 1/2013 |
| CN | 202688933 U | 1/2013 |
| CN | 203475365 U | 3/2014 |
| CN | 203514240 U | 4/2014 |
| CN | 103775384 A | 5/2014 |
| CN | 104207454 A | 12/2014 |
| CN | 104343746 A | 2/2015 |
| CN | 104420432 A | 3/2015 |
| CN | 102296555 B | 5/2015 |
| CN | 102482856 B | 7/2015 |
| CN | 104919973 A | 9/2015 |
| CN | 204617367 U | 9/2015 |
| CN | 105248156 A | 1/2016 |
| CN | 204969959 U | 1/2016 |
| CN | 205154642 U | 4/2016 |
| CN | 205306234 U | 6/2016 |
| CN | 205378984 U | 7/2016 |
| CN | 105816101 A | 8/2016 |
| CN | 105816104 A | 8/2016 |
| CN | 205639097 U | 10/2016 |
| CN | 205776021 U | 12/2016 |
| CN | 106436628 A | 2/2017 |
| CN | 106436629 A | 2/2017 |
| CN | 106510169 A | 3/2017 |
| CN | 106618381 A | 5/2017 |
| CN | 206183166 U | 5/2017 |
| CN | 106821142 A | 6/2017 |
| CN | 105297659 B | 7/2017 |
| CN | 206418446 U | 8/2017 |
| CN | 105297660 B | 9/2017 |
| CN | 107198492 A | 9/2017 |
| CN | 206482185 U | 9/2017 |
| CN | 107268501 A | 10/2017 |
| CN | 107269550 A | 10/2017 |
| CN | 107303065 A | 10/2017 |
| CN | 107373988 A | 11/2017 |
| CN | 206651502 U | 11/2017 |
| CN | 105274952 B | 12/2017 |
| CN | 107455900 A | 12/2017 |
| CN | 206736818 U | 12/2017 |
| CN | 206801962 U | 12/2017 |
| CN | 207049045 U | 2/2018 |

(56) References Cited

FOREIGN PATENT DOCUMENTS

| CN | 107761632 | A | 3/2018 |
|---|---|---|---|
| CN | 107772736 | A | 3/2018 |
| CN | 107898100 | A | 4/2018 |
| CN | 107996121 | A | 5/2018 |
| CN | 108029324 | A | 5/2018 |
| CN | 108055908 | A | 5/2018 |
| CN | 207306313 | U | 5/2018 |
| CN | 207393415 | U | 5/2018 |
| CN | 207520088 | U | 6/2018 |
| CN | 108260912 | A | 7/2018 |
| CN | 106677105 | B | 8/2018 |
| CN | 107201734 | B | 8/2018 |
| CN | 108378518 | A | 8/2018 |
| CN | 107288084 | B | 9/2018 |
| CN | 207919464 | U | 9/2018 |
| CN | 104983168 | B | 11/2018 |
| CN | 108741566 | A | 11/2018 |
| CN | 108742297 | A | 11/2018 |
| CN | 108797483 | A | 11/2018 |
| CN | 208081679 | U | 11/2018 |
| CN | 109123983 | A | 1/2019 |
| CN | 109371888 | A | 2/2019 |
| CN | 109372801 | A | 2/2019 |
| CN | 208462684 | U | 2/2019 |
| CN | 208524019 | U | 2/2019 |
| CN | 208577990 | U | 3/2019 |
| CN | 208577992 | U | 3/2019 |
| DE | 2362345 | A1 | 6/1975 |
| EP | 1355064 | B1 | 3/2005 |
| GB | 2079373 | A | 1/1982 |
| JP | 06242758 | B2 | 1/2016 |
| WO | 1997041631 | A1 | 11/1997 |
| WO | 2014001496 | A1 | 1/2014 |
| WO | 2015005140 | A1 | 1/2015 |
| WO | 2015150720 | A1 | 10/2015 |
| WO | 2017060003 | A1 | 4/2017 |
| WO | 2017109360 | A1 | 6/2017 |
| WO | 2017181484 | A1 | 10/2017 |
| WO | 2018164145 | A1 | 9/2018 |
| WO | WO2019153397 | A1 | 8/2019 |

OTHER PUBLICATIONS

European Search Report for EP Patent Application No. EP21152742 dated May 28, 2021; 3 pages.
Canadian Office Action corresponding with Application No. 3,106,213 dated Mar. 23, 2022 (1 page).
European Communication Corresponding with Application No. EP21152737.9 dated Feb. 8, 2023 (1 page).

* cited by examiner

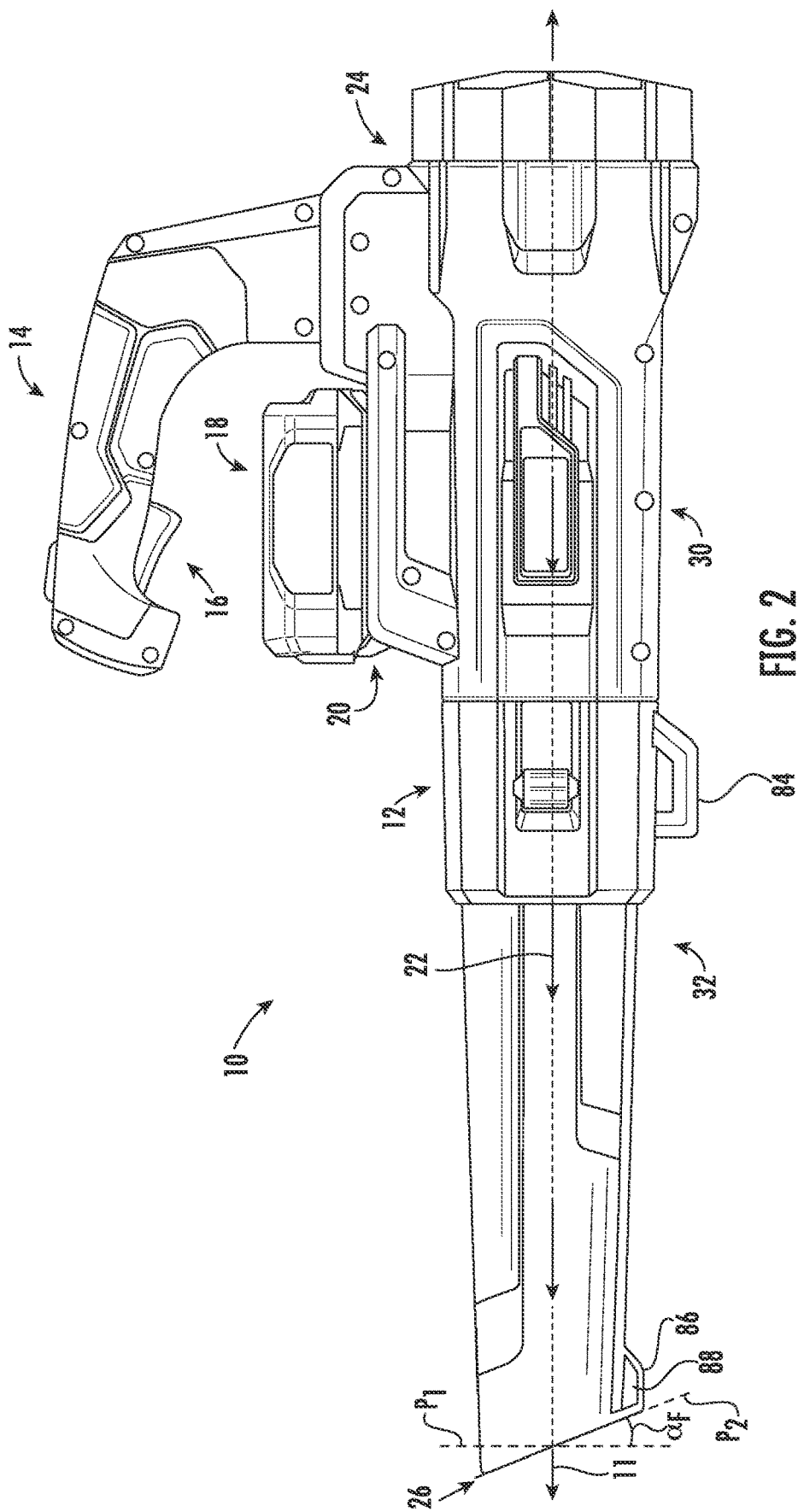

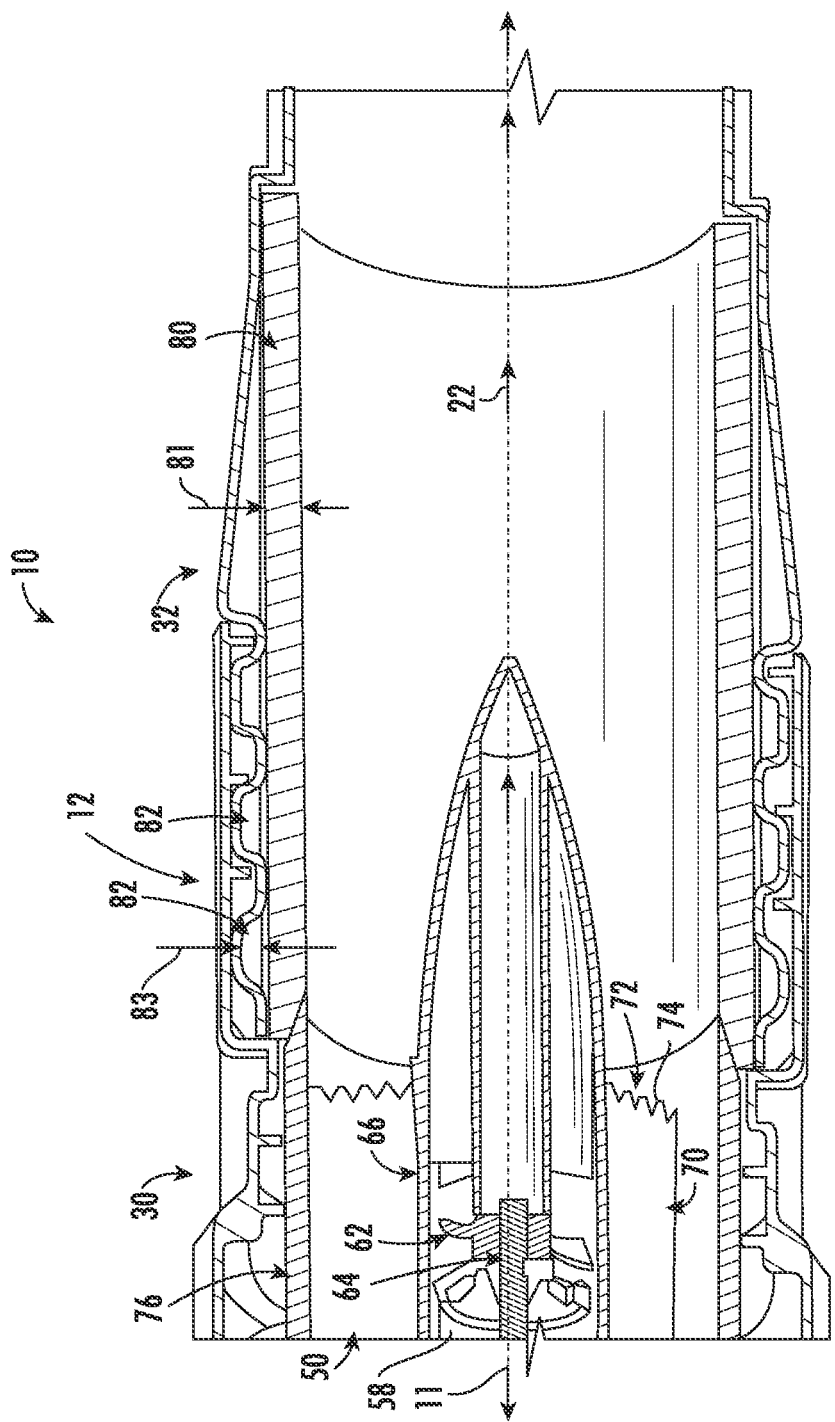

POWER TOOL HAVING NOISE REDUCTION FEATURES

This application claims the benefit of priority to U.S. Provisional Patent Application No. 62/963,806, filed on Jan. 21, 2020, the disclosure of which is incorporated by reference herein in its entirety.

FIELD

The present disclosure relates to power tools, and more particularly to power tools used in outdoor applications. In particular, the present disclosure relates to power tools having improved noise reduction features.

BACKGROUND

Power tools are generally utilized to more effectively perform tasks that might otherwise require human labor. For example, power tools such as lawn mowers may replace traditional hand-powered mowers, compressors and inflators may replace hand pumps, snow blowers may replace shovels and plows, and chain saws may replace hand saws. People frequently utilize such power tools to more efficiently and easily perform tasks.

One issue with many power tools is the noise level generated during operation. Such noise may emanate from engines, fan blades, and other moving and stationary components of the power tools. While quitter power tools can be produced simply by reducing the power and performance level of the power tool, the resulting product is not desirable to the customer due to the lack of performance.

Accordingly, improved power tools which include noise reduction features while not having diminished performance are desired. In particular, power tools which include both reduced noise generation and improved performance characteristics would be advantageous.

BRIEF DESCRIPTION

Aspects and advantages of the invention will be set forth in part in the following description, or may be obvious from the description, or may be learned through practice of the invention.

In accordance with one aspect, the present disclosure is directed to a power tool including an air inlet. The air inlet may be in fluid communication with a noise generating element of the power tool, such as an engine, fan blade, or the like. In certain instances, airflow can pass through the air inlet and move toward the noise generating element. The power tool can further include an inlet muffler in fluid communication with the air inlet. The inlet muffler can include a plurality of inlet ports. Each of the plurality of inlet ports can include a peripheral surface defining a port aperture therethrough. At least one of the plurality of inlet ports can further include a damper material provided on the peripheral surface of the at least one inlet port and define the port aperture therethrough.

In accordance with one aspect, a power tool can define an operational power to dampening loss ratio $[P_M/P_U/dB_M/dB_U]$ of at least 1.25, where $dB_M$ is a muffled sound intensity of the outdoor power tool when equipped with an air inlet muffler, where $dB_U$ is a non-muffled sound intensity of the outdoor power tool when not equipped with the air inlet muffler, where $P_M$ is a maximum muffled operational power capacity of the outdoor power tool when equipped with the air inlet muffler, and where $P_U$ is a non-muffled operational power capacity of the outdoor power tool when not equipped with the air inlet muffler.

In accordance with one aspect, a method of dampening a power tool can include aligning an inlet muffler relative to an air inlet of a power tool and installing the inlet muffler on the air inlet. The inlet muffler can include a plurality of inlet ports each including a peripheral surface defining a port aperture therethrough. At least one of the plurality of inlet ports can further include a damper material provided on the peripheral surface of the at least one inlet port and further defining the port aperture therethrough. In an embodiment, the method can further include assembling at least one of the plurality of inlet ports prior to installing the inlet muffler on the air inlet. Assembling the at least one inlet port can include installing a damper material over a framework, where an inner circumference of the damper material expands when installed over the framework. The method can also include attaching a plurality of inlet ports together to form the inlet muffler after assembling the at least one of the plurality of inlet ports.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 2 is a side view of a blower in accordance with embodiments of the present disclosure;

FIG. 4 is a cross-sectional view of a portion of a main body of a blower in accordance with embodiments of the present disclosure;

DETAILED DESCRIPTION

Figure 1:
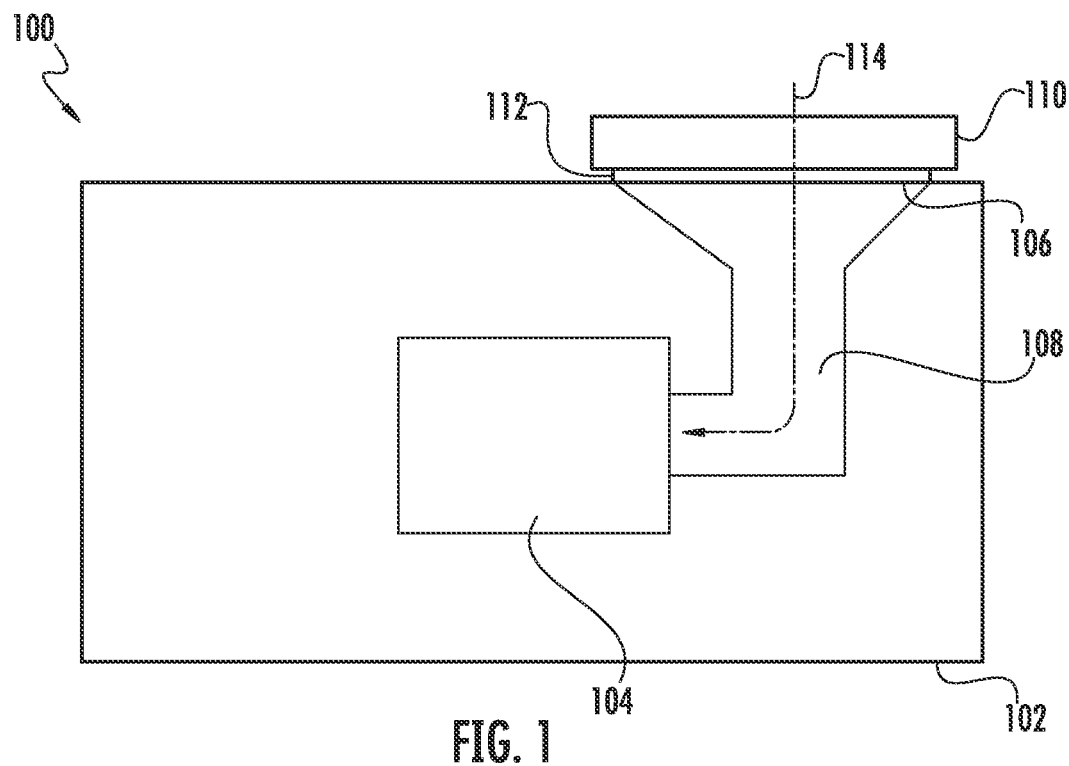
FIG. 1 includes a schematic view of a power tool in accordance with embodiments of the present disclosure.

Reference now will be made in detail to embodiments of the invention, one or more examples of which are illustrated in the drawings. Repeat use of reference characters in the present specification and drawings is intended to represent the same or analogous features or elements of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and do not necessarily signify sequence or importance of the individual components. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

FIG. 1 illustrates an exemplary schematic view of a power tool having noise reduction features 100 in accordance with the present disclosure. In an embodiment, the power tool having noise reduction features 100 can include a power tool 102, such as for example, an outdoor power tool like a lawn mower, a compressor, an inflator, a forced air heater, a pump, a fluid pump, a generator, a snow blower, a pressure washer, a chain saw, an edger, a trimmer, or a vacuum. In an embodiment, the power tool 102 can be an electric power tool, such as a battery-containing power tool or a corded electric power tool. In another embodiment, the power tool 102 can be gas powered.

The power tool 102 can include a noise generating element 104, such as for example, an engine, a fan blade or impeller, a compressor, a brush or stator, or the like. In certain instances, the noise generating element 104 can include one or more stationary or moving component(s) that generate noise through resonance with airflow therethrough. In other instances, the noise generating element 104 can include a combustion engine. In yet other instances, the noise generating element 104 can include a plurality of components, such as for example, a combustion engine driving a rotating fan blade.

The noise generating element 104 can be in fluid communication, such as coupled with, an air inlet port 106 of the power tool 102 through an aperture 108 extending between the noise generating element 104 and the air inlet port 106. In an embodiment, the air inlet port 106 can define an outermost boundary of the air inlet port 106. An inlet muffler 110 can be disposed on or adjacent to the air inlet port 106. In certain instances, the inlet muffler 110 can be selectively detachable from the air inlet port 106. In such a manner, the inlet muffler 110 can be changed, adjusted, or otherwise manipulated. In other instances, the inlet muffler 110 can be fixed with respect to the air inlet port 106.

In one or more embodiments, the air inlet port 106 can be disposed within a boundary defined by the power tool 102, such as within the power tool 102. In one or more embodiments, the air inlet port 106 can be disposed external to the boundary defined by the power tool 102. In yet other embodiments, the air inlet port 106 can be disposed at or adjacent to a boundary defined by the power tool 102. The inlet muffler 110 can be coupled to the air inlet port 106 through one or more intermediary passageways 112, channels, and/or ports. Air flow 114 through the inlet muffler 110 can pass through the air inlet port 106, through the aperture 108, to the noise generating element 104. In certain embodiments, air flow 114 can provide oxygen to an internal combustion engine. In other embodiments, air flow 114 can be compressed or otherwise biased within the power tool, e.g., by a fan blade or impeller. In yet other embodiments, air flow 114 can both provide oxygen to an internal combustion engine or one or more similar component(s) and provide air for compression or biasing.

The power tool 102 can define a first sound intensity, $dB_1$, at an upstream side of the inlet muffler 40 closer to an exterior of the power tool 102, and a second sound intensity, $dB_2$, at a downstream side of the inlet muffler 40, different from $dB_1$. In an embodiment, $dB_1$ is at least 1 dB less than $dB_2$, such as at least 10 dB less than $dB_2$, such as at least 20 dB less than $dB_2$. In such a manner, noise emitted by the noise generating element 104 can be dampened to an external environmental.

In an embodiment, the power tool 102 can define a non-muffled sound intensity, $dB_U$, as measured when the power tool 102 is not equipped with the inlet muffler 110, and a muffled sound intensity, $dB_M$, as measured when the power tool 102 is equipped with the inlet muffler 110, less than $dB_U$. In certain instances $dB_M$ can be at least 0.1 dB less than $dB_U$, such as at least 0.5 dB less than $dB_U$, such as at least 1 dB less than $dB_U$, such as at least 1.5 dB less than $dB_U$, such as at least 2 dB less than $dB_U$, such as at least 3 dB less than $dB_U$, such as at least 4 dB less than $dB_U$, such as at least 5 dB less than $dB_U$, such as at least 7.5 dB less than $dB_U$, such as at least 10 dB less than $dB_U$. In an embodiment, a muffled ratio $[dB_M/dB_U]$ of the power tool 102 can be less than 0.99, such as less than 0.98, such as less than 0.97, such as less than 0.96, such as less than 0.95, such as less than 0.9, such as less than 0.8.

In an embodiment, the power tool 102 can define a non-muffled operational power capacity, $P_U$, as measured when the power tool 102 is not equipped with the inlet muffler 110, and a muffled operational power capacity, $P_M$, as measured when the power tool is equipped with the inlet muffler, where $P_M$ is no less than 0.85 $P_U$, such as no less than 0.9 $P_U$, such as no less than 0.91 $P_U$, such as no less than 0.92 $P_U$, such as no less than 0.93 $P_U$, such as no less than 0.94 $P_U$, such as no less than 0.95 $P_U$, such as no less than 0.96 $P_U$, such as no less than 0.97 $P_U$, such as no less than 0.98 $P_U$, such as no less than 0.99 $P_U$. In an embodiment, $P_M$ can be approximately equal to $P_U$. In such a manner, the operational power capacity of the power tool 102 can be largely unaffected by use of the inlet muffler 110 to dampen sound intensity of the power tool 102.

In an embodiment, the power tool 102 can define an operational power to dampening loss ratio $[P_M/P_U/dB_M/dB_U]$ of at least 1.25, where $dB_M$ is a muffled sound intensity of the power tool 102 when equipped with an inlet muffler 110, where $dB_U$ is a non-muffled sound intensity of the power tool 102 when not equipped with the inlet muffler 110, where $P_M$ is a maximum muffled operational power capacity of the power tool 102 when equipped with the inlet muffler 110, and where $P_U$ is a non-muffled operational power capacity of the power tool 102 when not equipped with the inlet muffler 110. In a more particular embodiment, the operational power to dampening loss ratio can be at least 1.3, such as at least 1.35, such as at least 1.4, such as at least 1.45, such as at least 1.5, such as at least 1.55, such as at least 1.6, such as at least 1.65, such as at least 1.7, such as at least 1.75, such as at least 1.8, such as at least 1.85, such as at least 1.9, such as at least 1.95, such as at least 2, such as at least 2.5, such as at least 3, such as at least 3.5, such as at least 4.

Power tools 102 with high operational power to dampening loss ratios may exhibit noise reduction without corresponding power loss typical of conventional noise reduction techniques. Whereas conventional noise reduction techniques generally restrict airflow and thereby reduce operational power capacity, noise reduction techniques in accordance with embodiments described herein minimally affect operational power capacity.

In an embodiment, the inlet muffler 110 can define an airflow ratio $[AF_P/AF_T]$ as measured by a ratio of a cross-sectional area of the inlet muffler 110 through which airflow can pass unrestricted, $AF_P$, relative to the total cross-sectional area of the inlet muffler 110, $AF_T$, of no less than 0.8, such as no less than 0.825, such as no less than 0.85, such as no less than 0.875, such as no less than 0.9, such as no less than 0.925, such as no less than 0.95, such as no less than 0.975. The use of a high airflow ratio reduces power loss of the power tool 102, thus mitigating loss of performance from noise reduction.

In the exemplary embodiment described hereinafter, the power tool 102 is a blower 10. FIGS. 2 to 17 refer to specific aspects of blowers 10 in accordance with one or more embodiments of the present disclosure. However, any of the features described with respect to the blower 10 may be implemented in embodiments with respect to other power tools 102 described hereinafter, such as for example, lawn mowers, compressors, inflators, forced air heaters, pumps, fluid pumps, generators, snow blowers, pressure washers, chain saws, edgers, trimmers, vacuums, and the like.

Referring now to FIGS. 2 through 17, embodiments of blowers 10 in accordance with the present disclosure are provided. Blowers 10 in accordance with the present disclosure advantageously include improved noise reduction features, while also maintaining or having improved performance features. For example, in some exemplary embodiments, a blower 10 in accordance with the present disclosure produces at least 500 CFM, such as at least 550 CFM, flow rate at 125 mph velocity while keeping the sound at or below 70 dB(A), such as at or below 60 dB(A), at 50 feet (i.e. using the ANSI 50 foot test, ANSI/OPEI B175.2-2012 (amendment published Dec. 30, 2013, and/or ISO 22868, second edition 2011-03-01). In exemplary embodiments, a blower 10 in accordance with the present disclosure is a battery powered, handheld blower 10. In exemplary embodiments, the battery is a 40-volt (nominal) battery. The blower 10 may be configured to receive batteries of various sizes, shapes, and/or power capacities.

A blower 10 in accordance with the present disclosure may include a main body 12. A handle 14 may be connected to and extend from the main body 12. A trigger 16 may be included in the handle 14. The trigger 16 may be operable to cause operation of the blower 10 by activating and deactivating a motor 58 of the blower 10. The trigger 16 can include variable speed selectivity, allowing the operator to variably control the power of the blower 10 within a preset range of speeds.

A battery 18 may be removably connected to the blower 10 to power the blower 10, and specifically the motor 58 thereof. A battery mount 20 may be defined in the main body 12, and the battery 18 may be removably connectable to the battery mount 20. When connected in and to the battery mount 20, the battery 18 may provide a source of power to the blower 10, and specifically the motor 58 thereof. Battery mount 20 may, for example, provide an electrical connection between the battery 18 and the motor 58.

Main body 12 may define an airflow path 22 therethrough. The airflow path 22 may extend between and define an inlet end 24 and an outlet end 26 of the main body 12. Airflow along the airflow path 22 may flow into the main body 12 through the inlet end 24 and be exhausted from the main body 12 through the outlet end 26 when the blower 10 is operated as a blower. In one or more embodiments, the outlet end 26 of the main body can be angularly offset from the airflow path 22 by an angle, $\alpha_F$, as measured between a plane, $P_1$, oriented normal to the airflow path 22, and a plane, $P_2$, defined by the outlet end 26. In an embodiment, $\alpha_F$ can be at least 1°, such as at least 2°, such as at least 3°, such as at least 5°, such as at least 10°, such as at least 20°.

The main body 12 can include stabilizing elements 84 and 86 disposed on an underside to prevent the blower 10 from falling or rolling over when rested on the ground. In an embodiment, at least one of the stabilizing elements 84 and 86 can define an opening, e.g., opening 88, to allow the operator store the blower 10 on a member, e.g., a hook.

Main body 12 may include an inlet portion 30, which may include and define the inlet end 24, and may include an outlet portion 32, which may include the outlet end 26. In one or more embodiments, the inlet portion 30 may be removably coupled with the outlet portion 32. For example, in some embodiments the inlet portion 30 may be threadably coupled to the outlet portion 32. In embodiments, the inlet portion 30 may be coupled with the outlet portion 32, for example, through a non-threaded engagement, such as for example, a bayonet connection, a nonthreaded connector such as one or more pin(s), a clasp, a rotatable lever, a latch (e.g., exemplary latch 800 illustrated in FIGS. 8A and 8B), or any combination thereof. The latch 800 may be attached to the inlet portion 30, outlet portion 32, or both and selectively secure the inlet portion 30 and outlet portion 32 together. In the illustrated embodiment, the latch 800 is a pivotable latch pivotally coupled with the inlet portion 30. The latch 800 can include a pivotable body 802 with an engagement member (not illustrated) configured to engage with a mating component 804 on the outlet portion 32. In certain instances, the pivotable body 802 of the latch 800 may be pivotally coupled with the outlet portion 32 and engageable with mating component(s) 804 on the inlet portion 30. In an embodiment, the latch 800 may be spring biased to a locked configuration to facilitate easier connecting. For example, attaching the inlet and outlet portions 30 and 32 may be performed by aligning the portions 30 and 32 and applying combining force therebetween. The latch 800 can automatically receive a mating component and detachably couple the portions 30 and 32 together. In another embodiment, the latch can be essentially free of a spring biasing member. The latch 800 can be disposed on a lateral side of the blower 10, a top side of the blower 10, a bottom side of the blower 10, or anywhere between.

In one or more embodiments, the blower 10 can include a single latch 800. In other embodiments, the blower 10 can include a plurality of latches 800, such as at least two latches 800, at least three latches 800, or at last four latches 800. In an embodiment, the plurality of latches 800 can include same, or similar, type latches. In another embodiment, at least two of the plurality of latches 800 can include different-type latches or be operatively coupled to different components of the blower 10, e.g., one latch 800 can be pivotally coupled to the inlet portion 30 and one latch 800 can be pivotally coupled to the outlet portion 32.

The inlet portion 30 may house a fan assembly 50, as discussed herein. The outlet portion 32 may be downstream of the fan assembly 50 in the direction of the airflow path 22. In an embodiment, a technician may access the fan assembly 50 or other components of the blower 10 by removing the outlet portion 32 from the inlet portion 30 using the previously described latch(es) 800.

Figure 6:
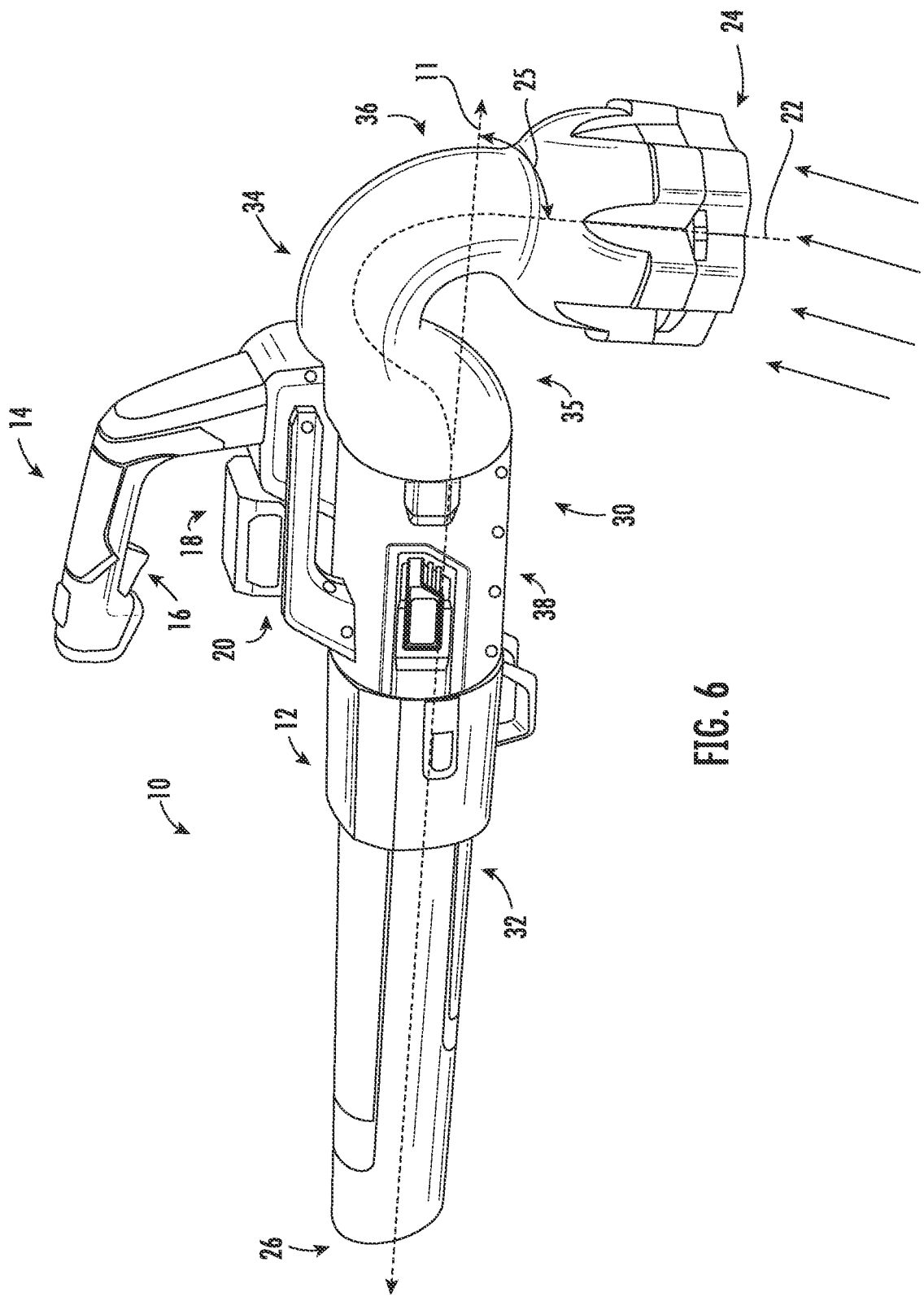
FIG. 6 is a perspective view of a blower in accordance with embodiments of the present disclosure.

A longitudinal axis 11 may be defined for the blower 10. In some embodiments, as illustrated in FIGS. 2 and 3, both the inlet portion 30 and outlet portion 32 may extend along (such as linearly and coaxially along) the longitudinal axis 11. In other embodiments, as illustrated in FIG. 6, the outlet portion 32 may extend along (such as linearly and coaxially along) the longitudinal axis 11 while at least a portion of the inlet portion 30 extends in a direction other than linearly along the longitudinal axis 11. For example, the inlet portion 30 may include a curvilinear portion 34 which extends along a curvilinear path relative to the longitudinal axis 11. In some embodiments, the curvilinear portion 34 may connect to the outlet portion 32, while in other embodiments, a linear portion 38 of the inlet portion 30 which extends along (such as linearly and coaxially along) the longitudinal axis 11 is disposed between and connects the curvilinear portion 34 and the outlet portion 32.

In some embodiments, the curvilinear portion 34 may include a first portion 35 which curves in a first direction and a second portion 36 which curves in a second opposite direction. Accordingly, in these embodiments the curvilinear portion 34 may have an S-shape.

Figure 5:
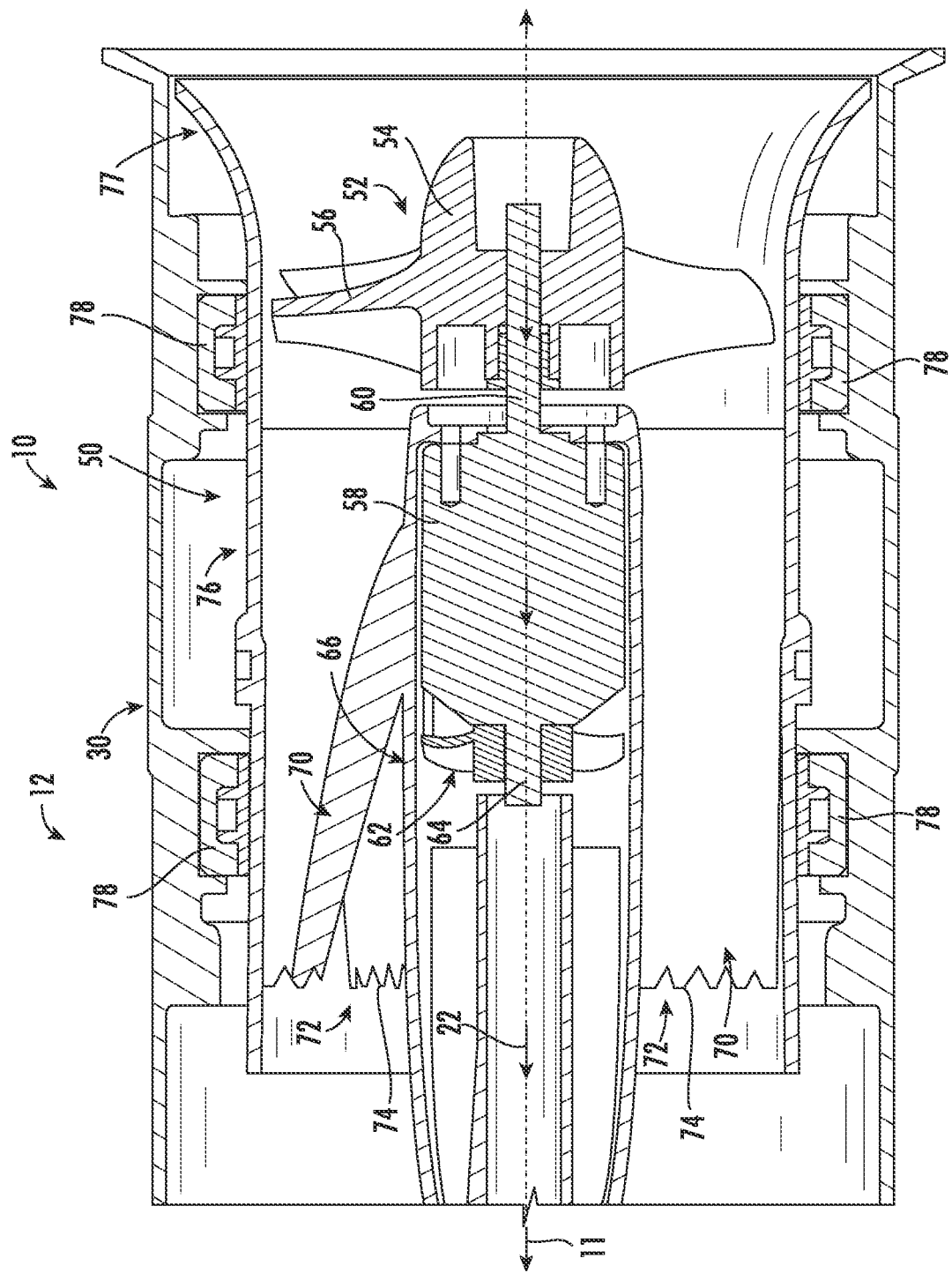
FIG. 5 is a cross-sectional view of another portion of a main body of a blower in accordance with embodiments of the present disclosure.

In some embodiments, as illustrated in FIGS. 2 and 3, a plane defined by the inlet end 24 is perpendicular to the longitudinal axis 11. In other embodiments, as illustrated in FIG. 5, a plane defined by the inlet end 24 is at an angle 25 to perpendicular to the longitudinal axis 11. The angle 25 may, for example, be between 70 degrees and 110 degrees, such as between 80 degrees and 100 degrees, such as between 85 degrees and 95 degrees. In exemplary embodiments as illustrated, such inlet end 24 may for example face away from the handle 14, and may face towards the ground when a user is holding the blower 10 in an operable position.

Figure 3A:
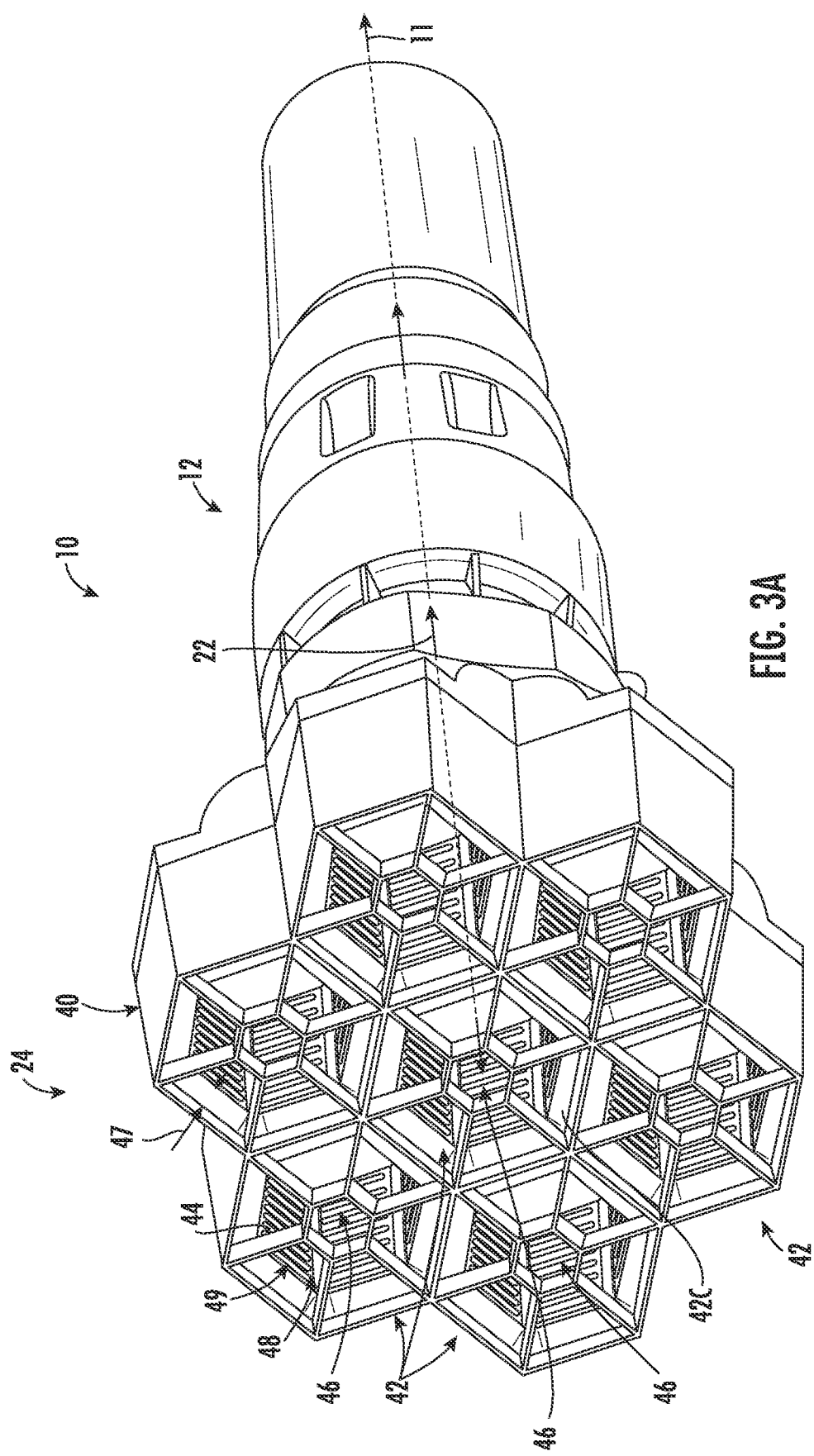
FIG. 3A is a rear perspective view of components of a blower in accordance with embodiments of the present disclosure.

Referring now in particular to FIG. 3A, a blower 10 in accordance with the present disclosure may include an inlet muffler 40 which is provided at the inlet end 24. Inlet muffler 40 may be connected to main body 12, and airflow path 22 may be defined through the inlet muffler 40. In an embodiment, the inlet muffler 40 can be detachably connected to the main body 12. The inlet muffler 40 may be swappable between various designs having different performance characteristics and attributes.

Inlet muffler 40 may advantageously include a plurality of inlet ports 42. Each inlet port 42 may be discrete from others of the plurality of inlet ports 42. In some exemplary embodiments, the plurality of inlet ports 42 may generally be aligned parallel to each other, e.g., the plurality of inlet ports 42 may lie along a single plane. In other embodiments, one or more inlet ports 42 may be aligned in a non-parallel manner with respect to other inlet ports 42. Each of the plurality of inlet ports 42 may include a peripheral surface 44 which defines a port aperture 46 through which the airflow path 22 is defined. Airflow path 22 may thus be defined through the plurality of inlet ports 42.

The use of a plurality of inlet ports 42, rather than a single inlet, advantageously allows for a significant reduction in the overall length of the muffler 40, such as by two to three times the length. In exemplary embodiments, the plurality of inlet ports 42 may include, such as consist of, between four and ten inlet ports 42, such as between five and nine inlet ports 42, such as between six and eight inlet ports 42, such as seven inlet ports 42.

In one or more embodiments, at least one of the plurality of inlet ports 42 can define a polygonal cross-sectional shape. In the exemplary embodiment illustrated in FIG. 3A, each of the plurality of inlet ports 42 has a hexagonal cross-sectional shape. In exemplary embodiments, the plurality of inlet ports 42 may include a central inlet port 42C surrounded by a number of surrounding ports 42, such as a layer of six surrounding ports 42. In one or more embodiments, volumetric air flow through the inlet ports 42 may be generally equal between the different inlet ports 42. In other embodiments, the inlet ports 42 may receive different amounts of volumetric air flow therethrough. For example, the central inlet port 42C may receive lower volumetric air flow rates as compared to each of the six surrounding ports 42.

Figure 9A:
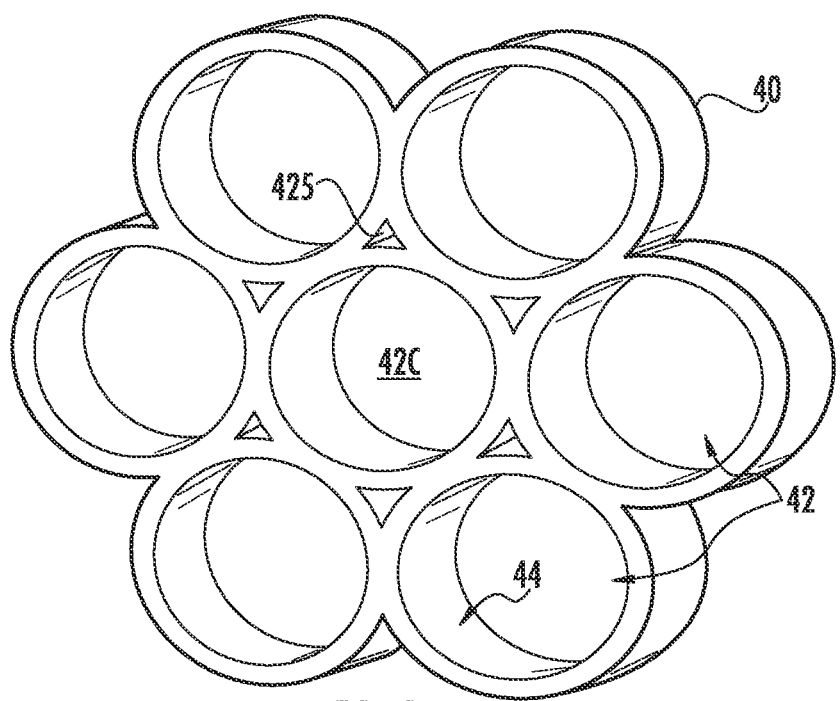
FIGS. 9A to 9C are perspective views of inlet mufflers of a blower in accordance with embodiments of the present disclosure.
Figure 9B:
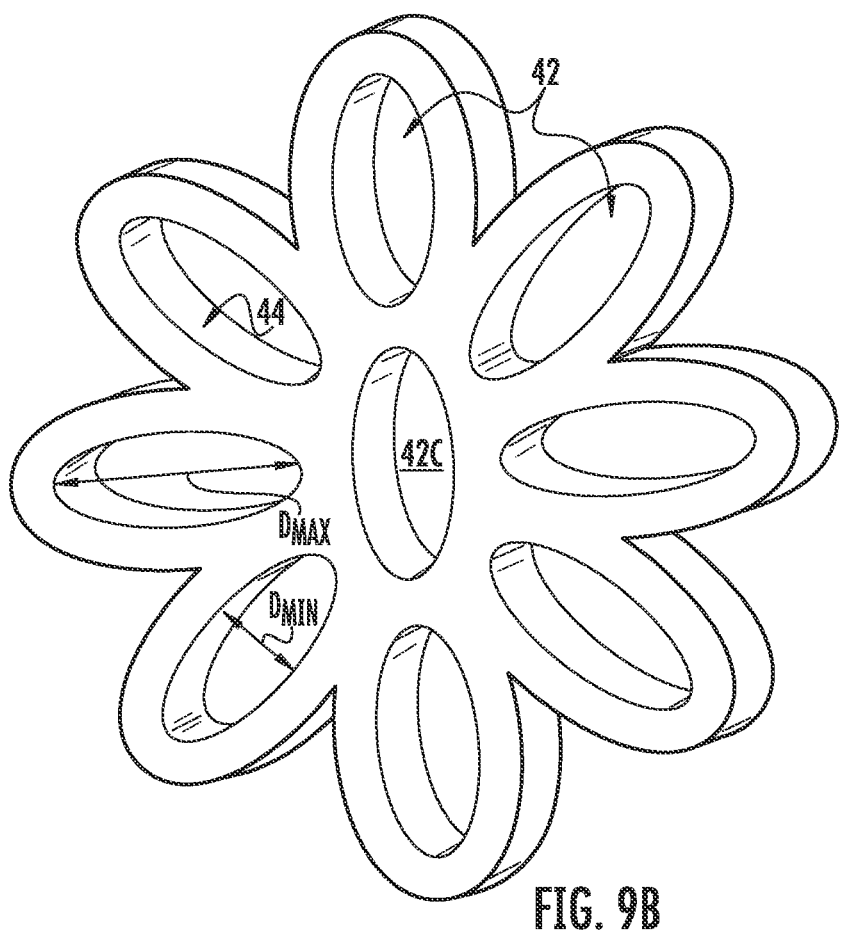

Referring to FIGS. 9A and 9B, in another exemplary embodiment, the plurality of inlet ports 42 may have curvilinear cross-sectional shapes defined by the peripheral surfaces 44. Curvilinear cross-sectional shapes can include circular cross sections (FIG. 9A), ovular cross sections (FIG. 9B), or other elongated, non-polygonal cross-sectional shapes. Ovular cross-sectional shapes can define aspect ratios [$D_{MAX}/D_{MIN}$], as measured by a maximum dimension of the shape, $D_{MAX}$, relative to a minimum dimension of the shape, $D_{MIN}$, of at least 1.01, such as at least 1.02, such as at least 1.05, such as at least 1.1, such as at least 1.25, such as at least 1.5, such as at least 2.0, such as at least 5.0. In an embodiment, the aspect ratio [$D_{MAX}/D_{MIN}$] can be no greater than 100.0, such as no greater than 50.0, such as no greater than 10.0.

In an embodiment, the inlet muffler 40 can define a central inlet port 42C having one or more different attributes as compared to the surrounding inlet ports 42 (see, e.g., FIG. 9B). For instance, the central inlet port 42C can have a different size than the surrounding inlet ports 42, a different shape than the surrounding inlet ports 42, a different angular orientation than the surrounding inlet ports 42, or any combination thereof.

In an embodiment, the surrounding inlet ports 42 may lie along a circular arc extending equidistant around a center point of the inlet muffler 40 (e.g., FIG. 9A). That is, each of the surrounding inlet ports 42 may be equidistant from the center point of the inlet muffler 40. In another embodiment, the surrounding inlet ports 42 may lie along an ovular, or otherwise elongated, arc extending around the center point of the inlet muffler 40 (e.g., FIG. 9B). The non-circular arc of the surrounding inlet ports 42 may directionally alter airflow along the airflow path 22, for example, causing greater air draw into the inlet muffler 40 from a desired location there along.

Figure 9C:
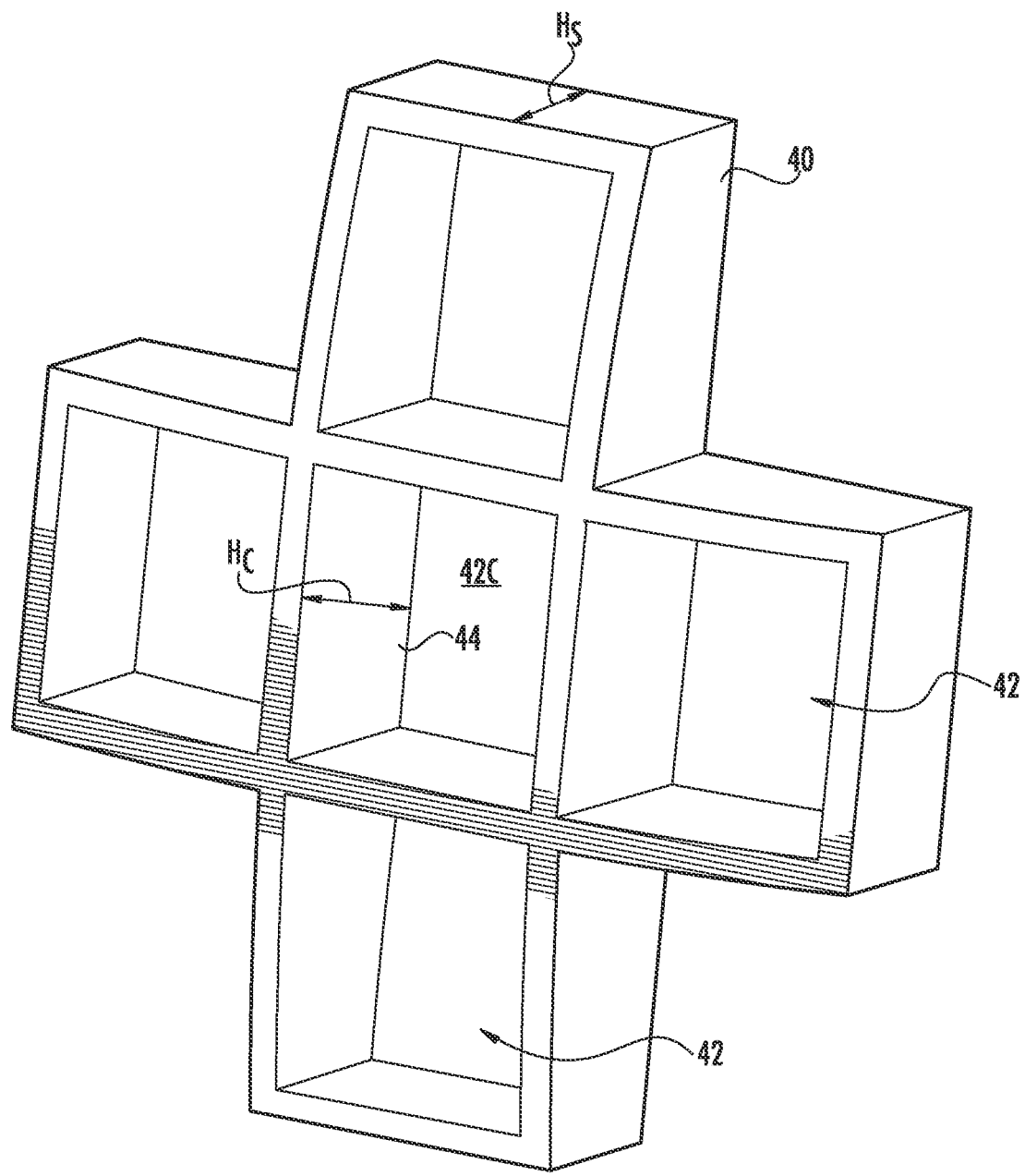

FIG. 9C illustrates yet another embodiment of an inlet muffler 40 including rectangular cross-sectional shaped inlet ports 42. More particularly, FIG. 9C illustrates square inlet ports 42 arranged in a grid pattern. While illustrated with only five square inlet ports 42, in other embodiments, the grid can include at least six inlet ports 42, such as at least seven inlet ports 42, such as at least eight inlet ports 42, and so on. In an embodiment, the peripheral surfaces 44 of the polygonal (e.g., square) inlet ports 42 can define arcuate interfaces where the peripheral surfaces 44 join together. In another embodiment, the peripheral surfaces 44 can define linear junctions, e.g., 90° interfaces as illustrated in FIG. 9C.

In an embodiment, the inlet muffler 40 can define an airflow ratio, $[AF_P/AF_T]$ as measured by a ratio of a cross-sectional area of the inlet muffler 40 through which airflow can pass unrestricted, $AF_P$, relative to the total cross-sectional area of the inlet muffler 40, $AF_T$, no less than 0.8, such as no less than 0.85, such as no less than 0.9, such as no less than 0.95, such as no less than 0.97, such as no less than 0.99.

In an embodiment, the height of the peripheral surfaces 44 of adjacent inlet ports 42, as measured parallel with the longitudinal axis 11, can be different. For instance, the central inlet port 42C of FIG. 9C can define a first height, $H_C$, different from a second height, $H_S$, of one or more of the surrounding inlet ports 42. In an embodiment, $H_C$ can be greater than $H_S$. For instance, $H_C$ can be at least 101% $H_S$, such as at least 105% $H_S$, such as at least 110% $H_S$, such as at least 120% $H_S$, such as at least 150% $H_S$. In another embodiment, $H_C$ can be less than 99% $H_S$, such as less than 95% $H_S$, such as less than 90% $H_S$, such as less than 80% $H_S$, such as less than 50% $H_S$. In one or more embodiments, the height of the inlet ports 42 can gradually change, such as illustrated in FIG. 9C. In other embodiments, the inlet ports 42 can include a castellated trailing surface defined by non-gradual height changes.

Referring again to FIG. 9A, in one or more embodiments, the inlet muffler 40 can include one or more secondary inlet ports 42S. In an embodiment, the secondary inlet ports 42S may define openings disposed radially between the central inlet port 42C and the surrounding inlet ports 42. The secondary inlet ports 42S may have different characteristics as compared to the central inlet port 42C, the surrounding inlet ports 42, or both. For instance, the secondary inlet ports 42S may be smaller than the surrounding inlet ports 42. The secondary inlet ports 42S may generate desirable air flow patterns within the blower 10. By way of example, air flow paths through the secondary inlet ports 42S may be angularly offset from the inlet ports 42 and 42C. The angularly offset flow paths may enhance air mixing within the blower 10 and/or generate a pre-swirl of air entering the inlet muffler 40.

Figure 10:
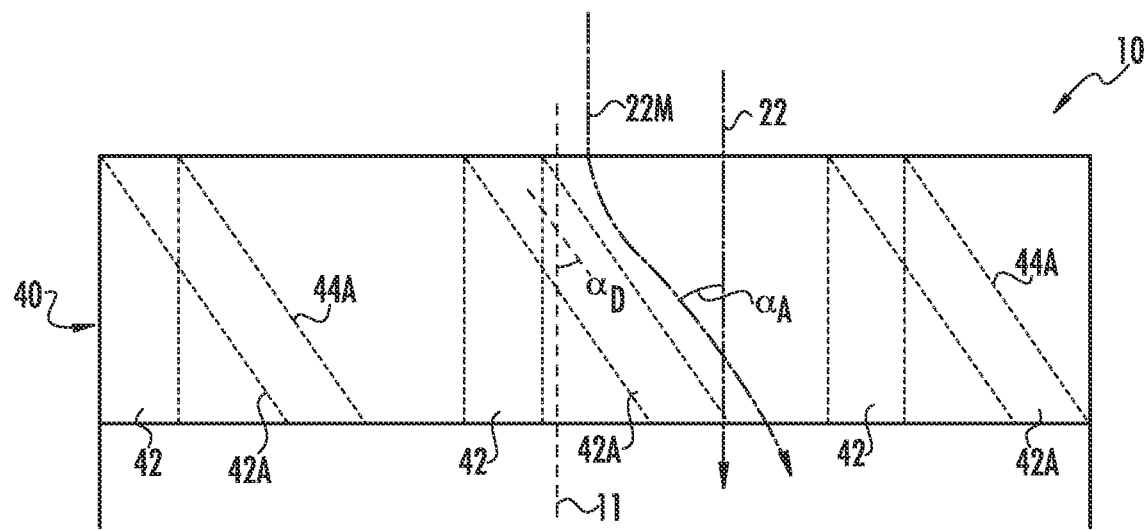
FIG. 10 is a schematic view of inlet ports of a blower in accordance with embodiments of the present disclosure.

In certain instances, at least one of the inlet ports 42 may be canted relative to the longitudinal axis 11 of the blower 10. For example, FIG. 10 illustrates a cross-sectional view of a schematic of the inlet muffler 40. In one or more embodiments peripheral surfaces 44A of the angled inlet ports 42A of the inlet muffler 40 can be canted relative to the longitudinal axis 11 of the blower 10. Air drawn into the blower 10 through the inlet muffler 40 can travel along a modified air flow path 22M created by the angled inlet ports 42A. As a result, air passing through the inlet muffler 40 can be angularly offset by an angle, $\alpha_A$, as compared to air entering the same inlet muffler 40 with non-angled inlet ports 42. In certain instances, the air flow path 22M can straighten slightly, i.e., conform slightly from the angle, $\alpha_A$, toward the longitudinal axis 11 of the blower 10, after passing through the inlet muffler 40 as a result of negative pressure caused longitudinally downstream by rotor blades associated with the spinning motor.

In an embodiment, the degree of angular offset, $\alpha_A$, of the modified air flow path 22M may be determined at least in part by an angular displacement, $\alpha_D$, of the angled inlet ports 42A relative to the longitudinal axis 11. In an embodiment, the angular displacement, $\alpha_D$, of the angled inlet ports 42A can be at least 1°, such as at least 2°, such as at least 3°, such as at least 4°, such as at least 5°, such as at least 10°, such as at least 25°, such as at least 45°, such as at least 60°. While illustrated with straight peripheral surfaces 44A, in another embodiment, the peripheral surface(s) 44A of at least one of the angled inlet ports 42A can be arcuate, polygonal, or include arcuate and linear portions, as viewed in cross section. Moreover, at least two of the peripheral surfaces 44A can define different angular displacements, $\alpha_D$, as compared to one another, thereby creating multiple unique modified air flow paths 22M.

In an embodiment, the angular displacement, $\alpha_D$, of the angled inlet ports 42A can be fixed. That is, the angular displacement of the angled inlet ports 42A can be set at a non-adjustable angle relative to the longitudinal axis 11. In another embodiment, the angular displacement, $\alpha_D$, of the angled inlet ports 42A can be variable. For example, the blower 10 can include an operable interface (not illustrated) configured to permit an operator to selectively adjust the angular displacement, $\alpha_D$, of the angled inlet ports 42A. Using the operable interface, the operator can, for example, decrease the angular displacement, $\alpha_D$, of the angled inlet ports 42A or increase the angular displacement, $\alpha_D$, of the angled inlet ports 42A. The operable interface may be selectively lockable to maintain the angled inlet ports 42A at the desired angular displacement, $\alpha_D$.

Angled inlet ports 42A may be suitable for generating pre-swirl in the blower 10. That is, air flow into the blower 10 through angled inlet ports 42A of the inlet muffler 40 may be angularly offset relative to the longitudinal axis 11, creating rotational air patterns in the blower 10 prior to passing the motor 58 or rotor blades associated therewith. In an embodiment, the pre-swirl air flow condition can define the same direction of rotation through the blower 10 as caused by rotation of the downstream rotor blades. Use of a pre-swirl air flow condition may enhance noise reduction while maintaining performance of the blower 10 by reducing choppiness at the rotor blades.

Referring again to FIG. 3A, a damper material 48 may be provided on the peripheral surface 44 of each of the plurality of inlet ports 42, such as generally an entire periphery of the peripheral surface 44 of each of the plurality of inlet ports 42. The damper material 48 may further define the port aperture 46 therethrough, as shown. Accordingly, damper material 48 may further define the airflow path 22. Damper material 48 may be formed from a suitable damping material, such as in exemplary embodiments a foam or a fiber-based composite or other material, such as a glass-fiber or natural-fiber (such as jute) based composite or other material. In exemplary embodiments, the damping material may be an open cell material, such as an open cell foam. For example, damper material 48 may be formed from a polyurethane foam, such as in exemplary embodiments an open cell polyurethane foam. In exemplary embodiments, each damper material 48 may have a thickness 47 of between 6 millimeters and 10 millimeters, such as between 7 millimeters and 9 millimeters, such as 8 millimeters.

Figure 3B:
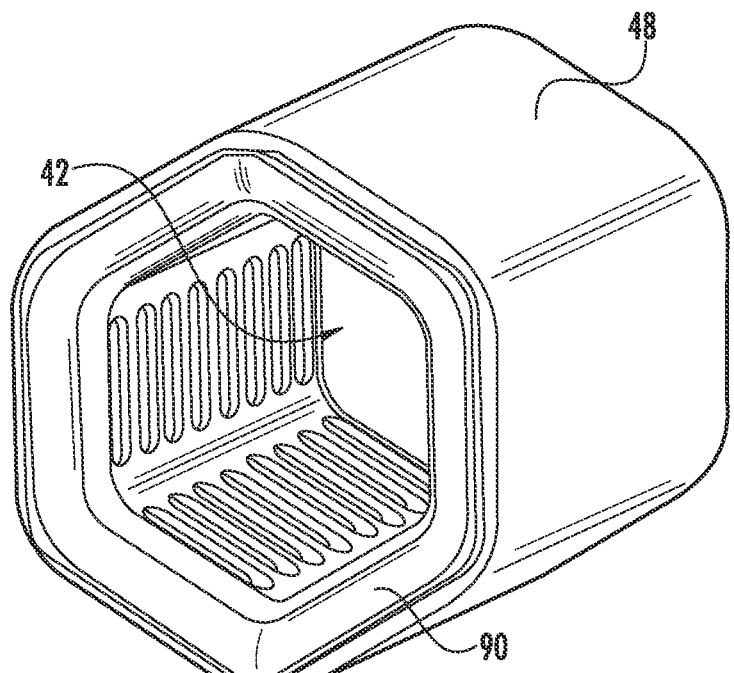
FIG. 3B is a perspective view of a frame of a blower in accordance with embodiments of the present disclosure.
Figure 3C:
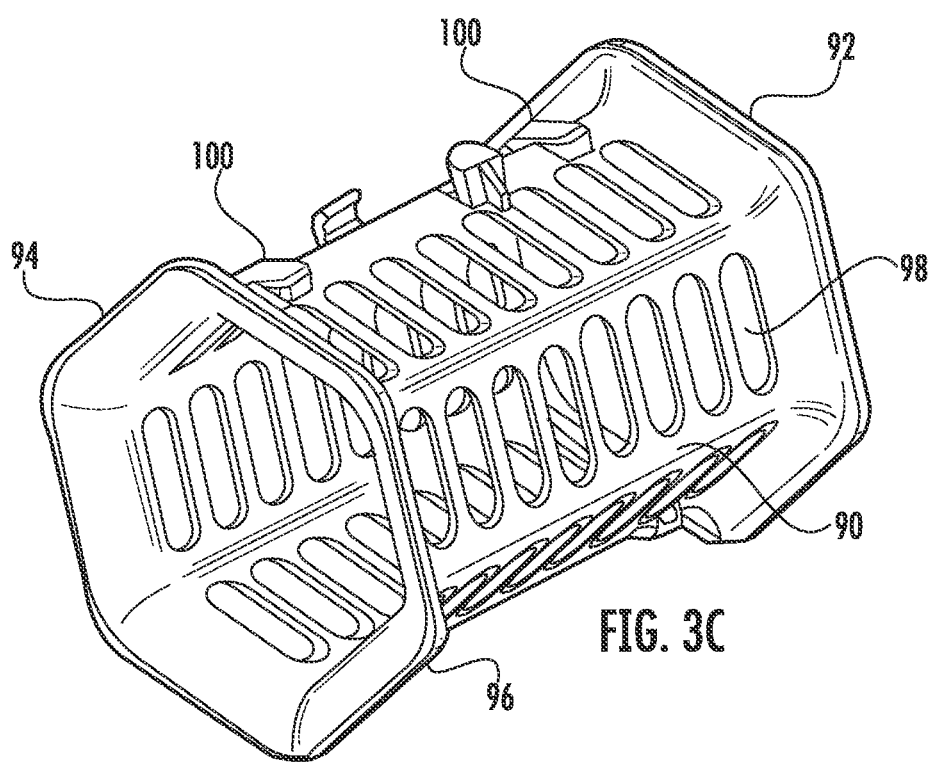
FIG. 3C is a perspective view of a damper of a blower in accordance with embodiments of the present disclosure.

FIG. 3B illustrates an exemplary framework 90 disposed within the damper material 48. As illustrated in FIG. 3C, the framework 90 can generally include a body 96 extending between a first axial end 92 and a second axial end 94. At least one of the first and second axial ends 92 and 94 can define a tapered profile, e.g., a flared opening, to facilitate airflow therethrough. The framework 90 can include one or more openings 98, such as a plurality of openings 98. The opening(s) 98 can be disposed along the body 96 and expose the damper material 48 to air passing through the air inlet port 42. In an embodiment, the body 96 can include at least ten openings 98, such as at least twenty openings 98, such as at least fifty openings 98. In an embodiment, the openings 98 can extend in one or more rows and/or one or more columns along the body 96. In an embodiment, the openings 98 can define a damper material exposure $[A_O/SA_B]$, as measured by an area, $A_O$, of all of the openings 98 of the framework 90 combined relative to a surface area, $SA_B$, of the body 96, of at least 0.05, such as at least 0.1, such as at least 0.25, such as at least 0.5, such as at least 0.75, such as at least 1.0, such as at least 1.25, such as at least 1.5. A relatively high damper material exposure may reduce noise from the blower 10, while a relatively low damper material exposure may lengthen effective operational lifespan of the damper material 48. In an embodiment, the damper material exposure is in a range between 0.5 and 1.25, such as in a range between 0.75 and 1.1.

In an embodiment, the framework 90 can further include retaining structures 100 configured to engage with the damper material 48. The retaining structures 100 can include, for example, clips, threaded fasteners, non-threaded fasteners, button fasteners, hooks, one or more mollies, hook and loop engagement, or other known attachment protocol. In an embodiment, the framework 90 can be removably attached to the damper material 48. In such a manner, the operator can selectively change the damper material 48, e.g., if the damper material 48 fouls or becomes contaminated during use.

In certain instances, the outer surface of the body 96 can define a shape generally similar to an inner shape of the damper material 48. In the illustrated embodiment, the framework 90 defines a generally hexagonal shape. In another embodiment, the framework 90 can define a curvilinear shape or have a shape corresponding to a different polygonal arrangement. In an embodiment, the damper material 48 can have a split 102 to permit installation thereof over the framework 90. For example, referring to FIG. 3B, the split 102 can extend axially between the first and second axial ends 92 and 94. During installation, the damper material 48 can be spread such that the framework 90 passes through the split 102. After installation, the split 102 can be connected, e.g., circumferential ends thereof can be fixed together, or left open. In a non-illustrated embodiment, the framework 90 can be installed within the damper material 48 by axially translating the framework 90 through an opening of the damper material 48.

Figure 11:
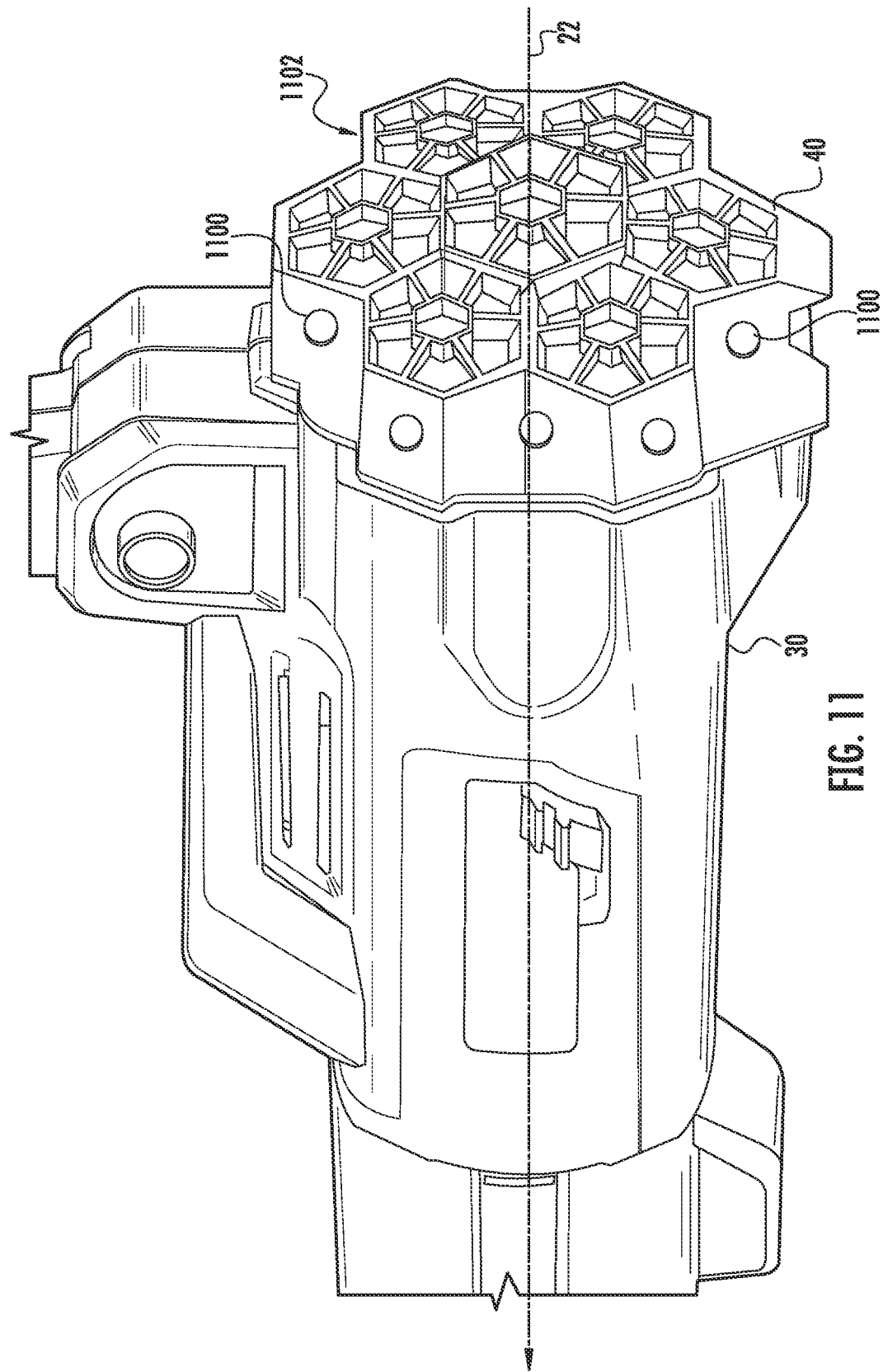
FIG. 11 is a perspective view of an inlet portion including an inlet muffler of a blower in accordance with embodiments of the present disclosure.

Referring to FIG. 11, in one or more embodiments the inlet muffler 40 can define one or more auxiliary openings 1100 passing through a side surface 1102 of the inlet muffler 40. In a non-illustrated embodiment, at least one of the openings 1100 can be part of the main body 12. By way of example, the inlet muffler 40 can include at least one opening 1100, such as at least two openings 1100, such as at least five openings 1100, such as at least ten openings 1100. In an embodiment, the openings 1100 can be equidistantly spaced apart from another around a circumference of the inlet muffler 40. In another embodiment, the openings 1100 can be stacked closer together at one location and spaced further apart at another location. For instance, the openings 1100 may be stacked closer together at a top side of the blower 10 and spaced further apart from one another at a bottom side of the blower 10. The openings 1100 may define air flow paths generally normal to the air flow path 22 previously described in the blower 10. In normal use, the openings 1100 may work together with air inlets 42 to allow air into the inlet portion 30 of the blower. The openings 1100 may advantageously permit air into the inlet portion 30 when one or more inlet ports 42 become restricted, e.g., with leaves or other debris stuck on the inlet muffler 40. Traditionally, such restrictions can increase motor noise, however, inclusion of openings 1100 may allow the motor to operate at a more desirable power level even upon occurrence of restrictions along the inlet muffler 40.

In one or more embodiments, the one or more openings 1100 can all have a same shape, size, or both. In other embodiments, at least two of the openings 1100 can be different from one another, e.g., have different sizes, shapes, or both. By way of example, at least one of the openings 1100 can have an arcuate shape, e.g., circular or ovular shape, or a polygonal shape, e.g., a rectangular or pentagonal shape.

In a non-illustrated embodiment, the blower 10 can further include an adjustable interface configured to selectably restrict air flow passage through at least one of the one or more openings 1100. The adjustable interface can include, for example, a rotatable or translatable sleeve disposed around the inlet muffler 40 and configured to selectively restrict air flow through the openings 1100. The operator can adjust the angular or linear displacement of the sleeve to selectively adjust air flow through the openings 1100. In certain non-limiting embodiments, the sleeve may be part of the inlet muffler 40.

Inlet muffler 40 advantageously provides significant noise reduction for blowers 10 in accordance with the present disclosure. Such noise reduction is advantageously provided while maintaining the performance of the blower 10. Further, such inlet mufflers 40 are relatively small in length, and use relatively thin damper materials 48, while providing such advantageous noise reduction.

Referring now to FIGS. 4 and 5, various components may be disposed within the main body 12 which advantageously provide noise reduction in blowers 10 in accordance with the present disclosure. For example, a fan assembly 50 may be disposed within the main body 12, such as in the inlet portion 30 thereof. Fan assembly 50 may include an axial fan 52 which includes a hub 54 and a plurality of rotor blades 56 extending radially outwardly from the hub 54.

Figure 12:
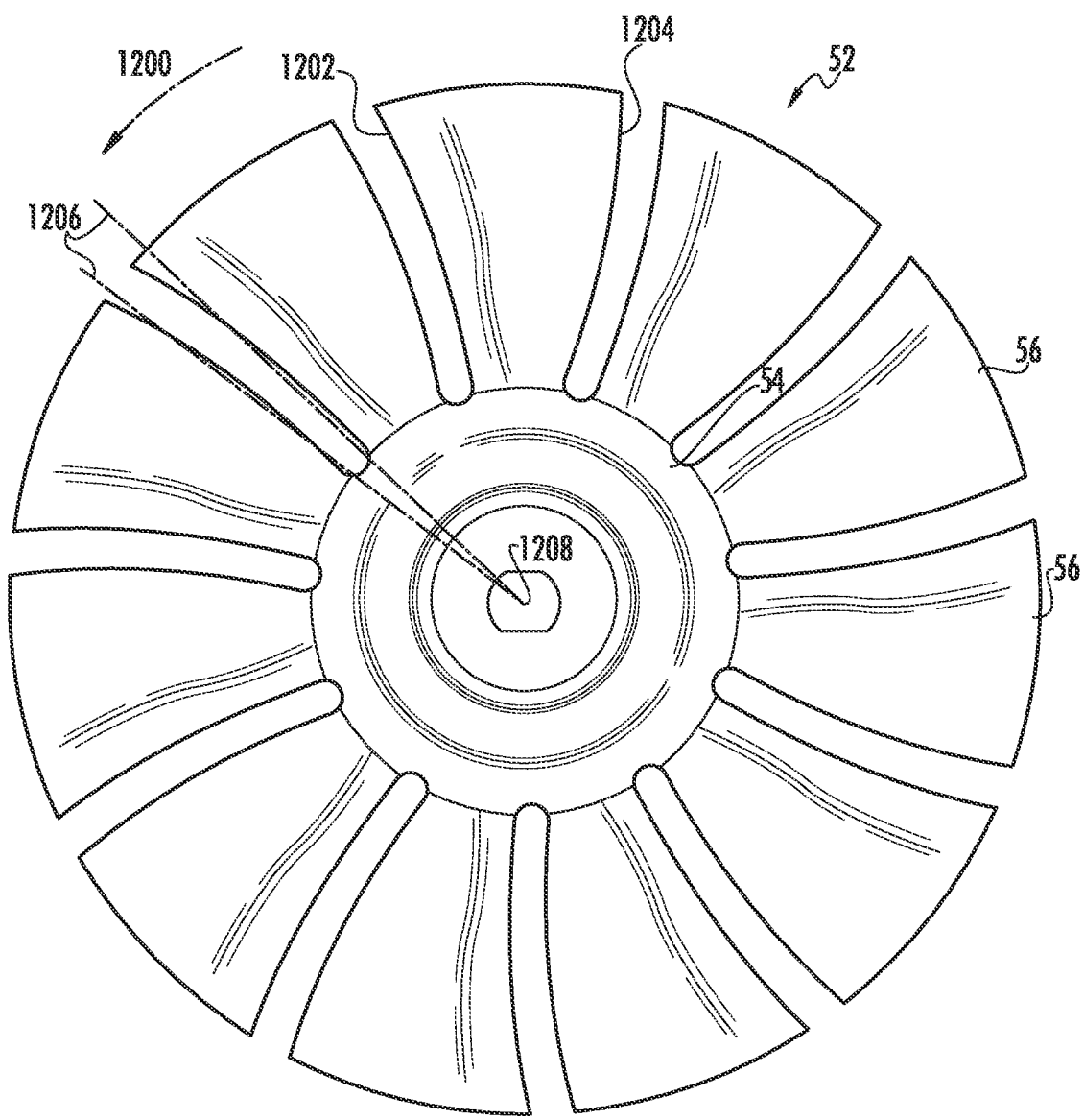
FIG. 12 is a front view of an axial fan of a blower in accordance with embodiments of the present disclosure.

FIG. 12 illustrates a front view of the axial fan 52 as seen looking from an upstream position in accordance with one or more embodiments herein. As illustrated, the rotor blades 56 extend radially outward from the hub 54. During normal operations, the hub 54 is configured to rotate in a direction indicated by arrow 1200. In this regard, each rotor blade 56 can define a leading edge 1202 and a trailing edge 1204 with respect to the angle of rotation. In an embodiment, at least a portion of at least one of the leading and trailing edges 1202 and 1204 can have a linear, i.e., straight, profile, as viewed along the longitudinal axis 11 of the blower 10. In another embodiment, at least a portion of at least one of the leading and trailing edges 1202 and 1204 can have a curved profile. In the illustrated embodiment, the leading and trailing edges 1202 and 1204 are both forward swept. That is, the leading and trailing edges 1202 and 1204 are angularly offset from lines 1206 extending radially from a center point 1208 of the axial fan 52. In another embodiment, only one of the leading and trailing edges 1202 or 1204 of at least one of the rotor blades 56 is forward swept. In yet a further embodiment, neither the leading or trailing edges 1202 and 1204 of at least one of the rotor blades 56 is forward swept. For example, at least one of the leading or trailing edges 1202 and 1204 of at least one of the rotor blades 56 may be backward swept or lie generally along the line 1206 extending radially from the center point 1108.

Figure 13:
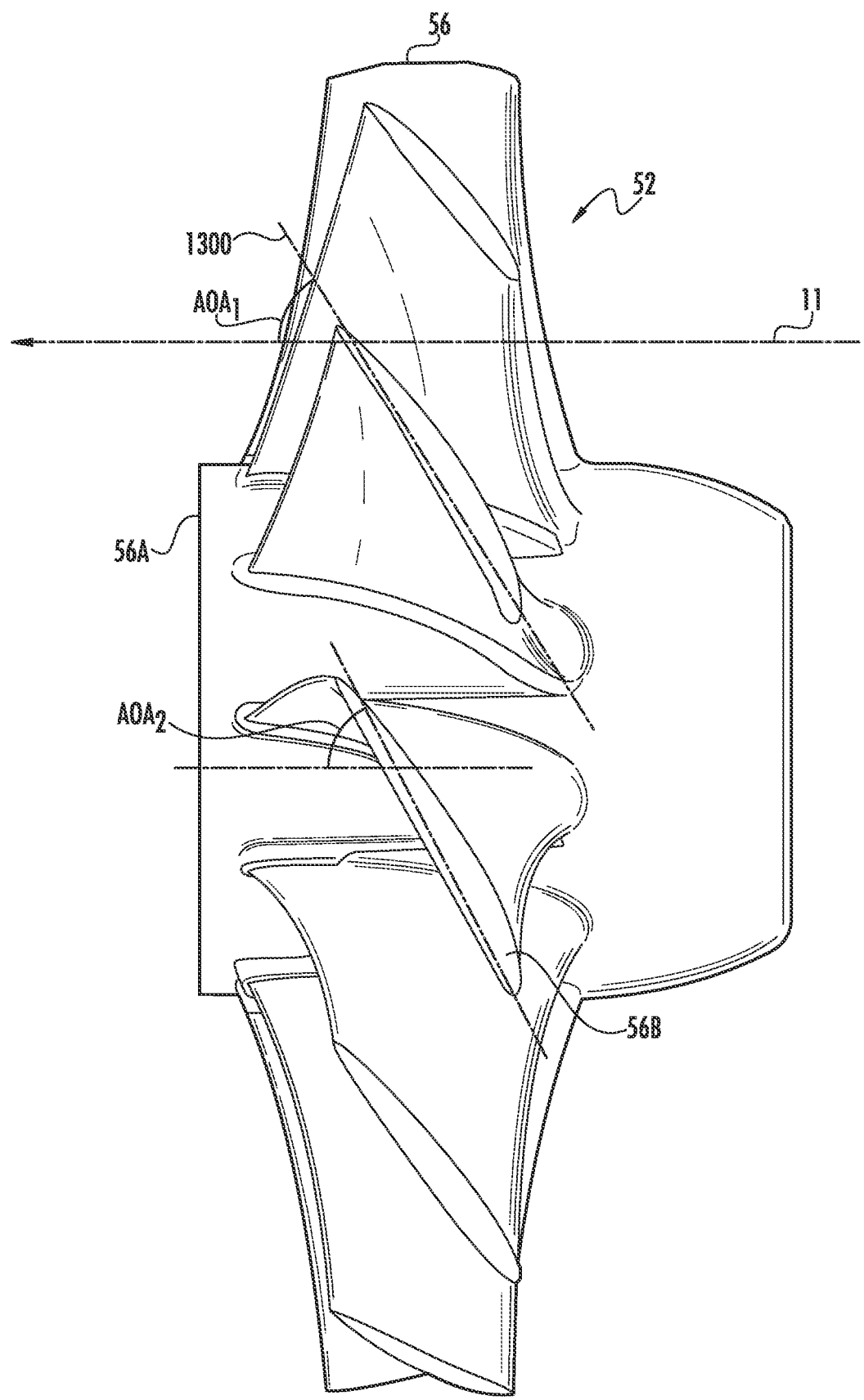
FIG. 13 is a side view of an axial fan of a blower in accordance with embodiments of the present disclosure.

The rotor blades 56 may be angled relative to the air flow path 22 to generate positive pressure on a downstream side of the axial fan 52 and corresponding negative pressure on an upstream side thereof. Referring to FIG. 13, the rotor blades 56 can be angled with respect to the longitudinal axis 11 of the blower 10. For instance, one of the rotor blades 56 can define a cross-sectional shape with a best fit line 1300 angularly offset from the longitudinal axis 11 of the blower by an angle of attack, AOA. The angle of attack of the rotor blades 56 may specify the positive and negative pressures generated by the axial fan 52 at operating speeds. By way of example, the angle of attack of at least one of the rotor blades 56 may be between 1° and 89°, such as between 20° and 70°.

In an embodiment, at least two of the rotor blades 56 can define different angles of attack. For instance, a first rotor blade 56A may define a first angle of attack, $AOA_1$, and a second rotor blade 56B may define a second angle of attack, $AOA_2$, different than $AOA_1$. By way of example, $AOA_1$ may be greater than $AOA_2$. For example, $AOA_1$ may be 1.01 $AOA_2$, such as 1.02 $AOA_2$, such as 1.05 $AOA_2$, such as 1.1 $AOA_2$, such as 1.2 $AOA_2$, such as 1.3 $AOA_2$, such as 1.5 $AOA_2$. In an embodiment, the angle of attack of adjacent rotor blades 56 may be different from one another. For instance, the rotor blades 56 may have alternating angles of attack, progressively staggered angles of attack, random angles of attack, or any other possible variation. Without wishing to be bound to a particular theory, it is believed that modifying the angle of attack of at least one of the rotor blades 56 with respect to other rotor blades 56 on the axial fan 52 may enhance noise reduction without sacrificing power of the blower 10.

Figure 18:
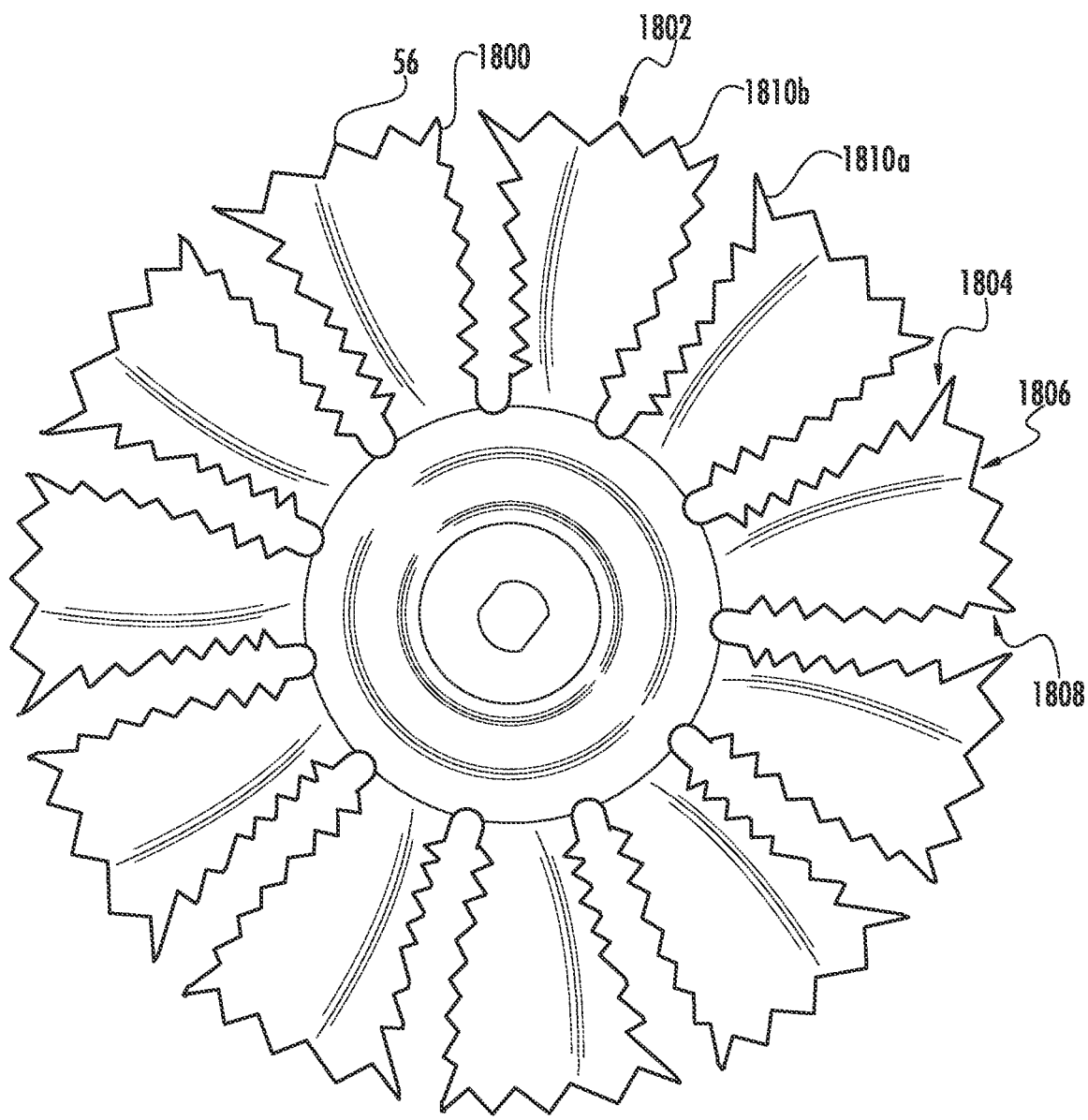
FIG. 18 is a front view of an axial fan of a blower in accordance with embodiments of the present disclosure.

FIG. 18 illustrates an embodiment of a rotor blade 56 including serrations 1800 disposed on edges 1802 of the rotor blades 56. In one or more embodiments, the serrations 1800 can be disposed on leading edge(s) 1804 of at least one of the rotor blades 56. In one or more embodiments, the serrations 1800 can be disposed on radially outer edge(s) 1806 of at least one of the rotor blades 56. In one or more embodiments, the serrations 1800 can be disposed on trailing edge(s) 1808 of at least one of the rotor blades 56. In an embodiment, the serrations 1800 can be disposed on any combination of leading, radially outer, and trailing edges 1804, 1806, and 1808.

In an embodiment, the serrations 1800 can all define a same, or generally similar, shape and/or depth into the rotor blade 56. In another embodiment, at least two serrations 1800 can have different characteristics as compared to one another, e.g., different shapes and/or depths as compared to one another. For example, the serrations on the leading edge 1804 of a first rotor blade 1810a can be different than the serrations on the leading edge 1804 of a second rotor blade 1810b. In another exemplary embodiment, the serrations on the leading edge 1804 of the first rotor blade 1810a can be different from the serrations of the radially outer edge 1806 of the first rotor blade 1810a.

The serrations 1800 can be shaped to reduce noise of the axial fan 52 without sacrificing power of the blower 10. The serrations 1800 can include curvilinear portions, polygonal portions, or any combination thereof. In certain instances, the serrations 1800 can have beveled, or multi-beveled, side surfaces that taper between axially opposite ends of the axial fan 52. In other instances, the serrations 1800 can have straight or otherwise non-beveled side surfaces. In an embodiment, the serrations 1800 can have rounded corners. In other embodiments, the serrations 1800 can have angled corners.

Referring again to FIG. 5, the fan assembly 50 may further include a motor 58 which is rotatably connected to the axial fan 52 and may cause the axial fan 52 to rotate due to operation thereof. For example, a shaft 60 may rotatably couple the motor 58 to the axial fan 52, such as to the hub 54 thereof. Rotation of the motor 58 may cause rotation of the shaft 60 and thus cause rotation of the axial fan 52.

Shaft 60 and axial fan 52 may be positioned on an upstream side of the motor 58 along the airflow path 22. Further, in some embodiments, a secondary fan 62 (which may be an axial fan having a hub and a plurality of rotor blades extending radially therefrom) and secondary shaft 64 (which may be integral with the shaft 60) may be positioned on a downstream side of the motor 58. Motor 58 may be operably coupled to the secondary fan 62 and may cause the secondary fan 62 to rotate due to operation thereof. Secondary shaft 64 may rotatably couple the motor 58 to the secondary fan 62, such as to a hub thereof. Rotation of the motor 58 may cause rotation of the secondary shaft 64 and thus cause rotation of the secondary fan 62. The secondary fan 62 may include any one or more of the features previously described with respect to the axial fan 52.

In exemplary embodiments, the motor 58 may be a brushless DC motor. Further, in exemplary embodiments, the motor 58 may be an outrunner type DC motor. Such outrunner type motors may be particularly advantageous due to their ability to provide relatively higher torque for a given motor diameter as compared to inrunner type motors.

Fan assembly 50 may further include a motor housing 66 which may generally surround and house the motor 58. Motor housing 66 may further surround and house the secondary shaft 64 and secondary fan 62. Shaft 60 may extend from the motor housing 66, and fan 52 may be exterior to the motor housing 66. Accordingly, motor housing 66 may be downstream of the fan 52 along the airflow path 22. In exemplary embodiments, at least a portion of the motor housing 66 (such as a downstream portion) is generally cone-shaped and thus tapers in diameter along the airflow path 22.

A plurality of stator vanes 70 may extend, such as generally radially, from the motor housing 66. Stator vanes

70 may thus be downstream of the fan 52 along the airflow path 22. In exemplary embodiments, the plurality of stator vanes 70 may include, such as consist of, between four and twelve stator vanes 70, such as between six and eleven stator vanes 70, such as between eight and ten stator vanes 70, such as nine stator vanes 70. The use of a relatively higher number of stator vanes 70 advantageously increases the initial resonant frequency associated with the stator vanes 70, thus providing a resonant frequency which can be more easily muffled using noise reduction features as discussed herein.

In exemplary embodiments, the downstream or trailing edges 72 of the stator vanes 70 may include noise reduction features 74. Such noise reduction features 74 may be structures mounted to the trailing edges 72 or shapes defined in the trailing edges 72, as shown. For example, in exemplary embodiments, such noise reduction features 74 are chevron shapes defined in the trailing edges 72. Noise reduction features 74 in accordance with the present disclosure advantageously provide further noise reduction for blowers 10 in accordance with the present disclosure.

Fan assembly 50 may further include an outer housing 76. Outer housing 76 may surround the fan 52 and motor 58, and may further surround the secondary fan 62. Outer housing 76 may further surround stator vanes 70, and stator vanes 70 may extend between and be connected to motor housing 66 and outer housing 76. Outer housing 76 may further surround at least a portion of the motor housing 66, such as an upstream portion thereof relative to airflow path 22. In some embodiments, a downstream portion of the motor housing 66 relative to the airflow path 22 may extend from the outer housing 76.

In some embodiments, outer housing 76 may include a bellmouth inlet 77 on an upstream end thereof in the airflow path 22. Bellmouth inlet 77 may facilitate the flow of air into and through the fan assembly 50.

In exemplary embodiments, a plurality of bushings 78 may be provided. Each bushing 78 may be disposed in contact between the outer housing 76 and the main body 12 (such as the inlet potion 30 thereof). Accordingly, each bushing 78 may be radially outward of the outer housing 76. Bushings 78 may in exemplary embodiments be formed from a suitable resilient material such as a rubber. Bushings 78 may support the outer housing 76 within and relative to the main body 12 and may advantageously reduce the noise associated with the fan assembly 50 due, for example, to vibration of the outer housing 76 and other components of the fan assembly 50 during operation of the blower 10.

Figure 17:
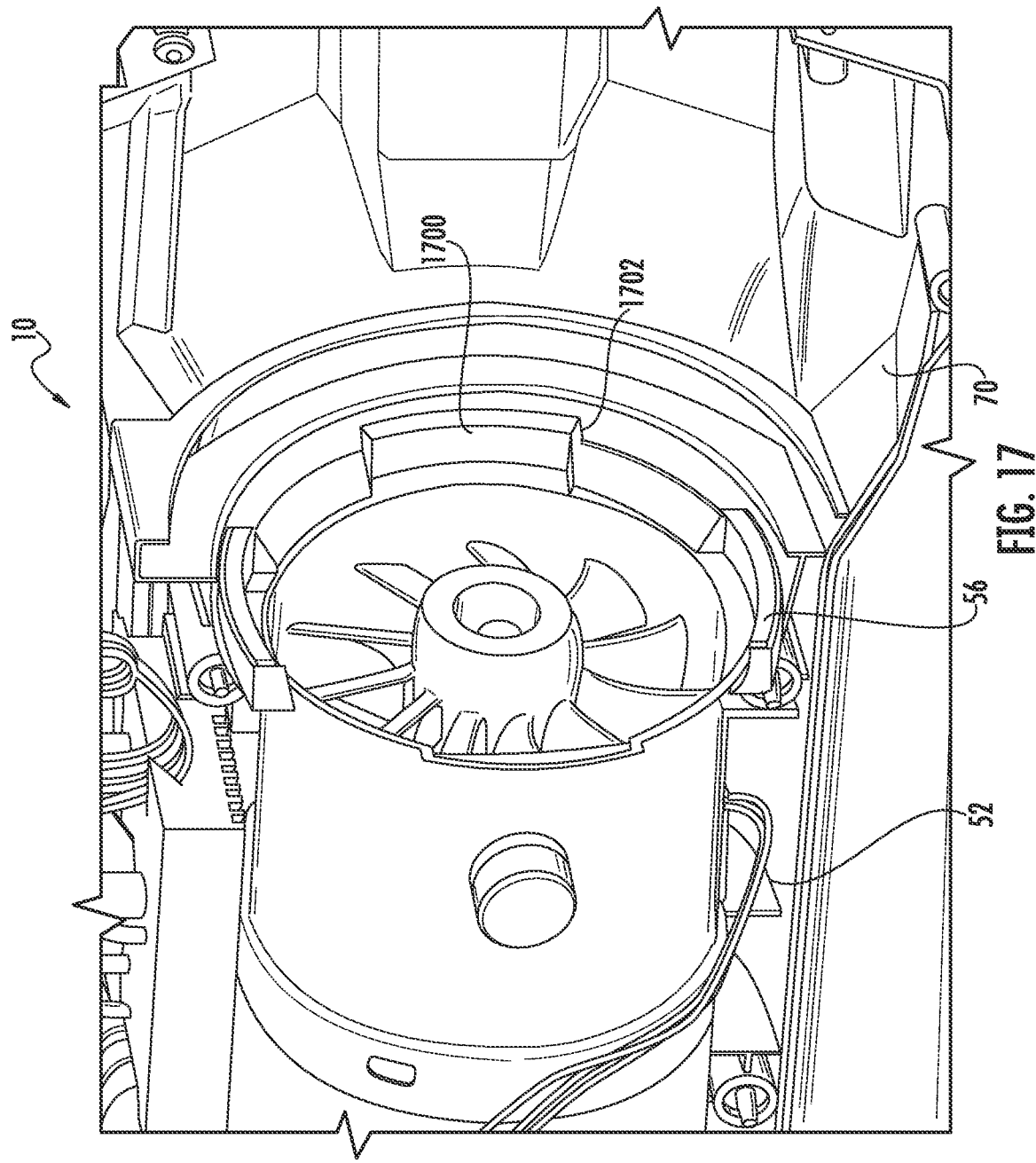
FIG. 17 is a cross-sectional perspective view of a portion of a blower including sound dampening elements in accordance with embodiments of the present disclosure.

FIG. 17 illustrates an embodiment of the blower 10 including dampening elements 1700 disposed between the outer housing 76 and the bellmouth (not illustrated). The dampening elements 1700 may be disposed in slots 1702 of the outer housing 76. The dampening elements 1700 may comprise foam, such as closed cell foam. The dampening elements 1700 may be formed of a material having a higher density than the damper material 48 previously described. In an embodiment, the dampening elements 1700 may reduce vibrational noise along the outer housing 76 thereby mitigating audible noise from the blower 10.

Figure 14:
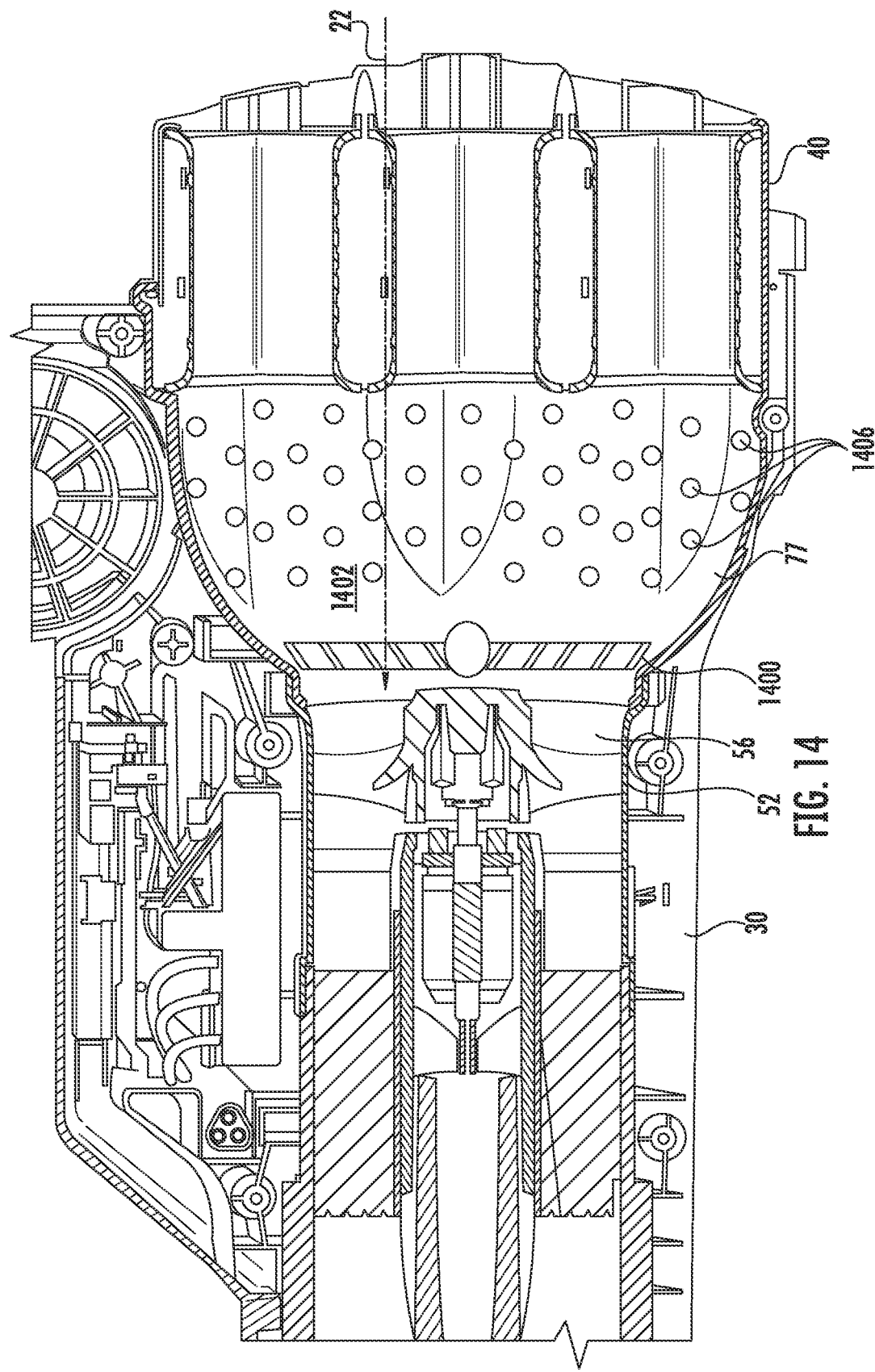
FIG. 14 is a cross-sectional view of a portion of the main body of a blower including a stator in accordance with embodiments of the present disclosure.

Referring now to FIG. 14, in one or more embodiments, the blower 10 can further include a stator 1400 upstream of the axial fan 52. The stator 1400 may form a pre-swirl of air within the inlet portion 30 ahead of the axial fan 52. Air entering through the inlet muffler 40 may pass through the stator 1400 where the air becomes rotationally swirled as it enters an area associated with the rotor blades 56 of the axial fan 52. In an embodiment, the stator 1400 may include a plurality of vanes 1402 configured to rotationally swirl the air in a pre-swirled path. The rotational pre-swirl may permit the axial fan 52 to operable at a lower noise level while producing the same output power. In an embodiment, the stator 1400 can be attached to, or part of, the bellmouth inlet 77. By way of example, the stator 1400 can be snap fit, fastened, or otherwise connected to the bellmouth inlet 77 or integrally formed therewith. The stator 1400 may generally be disposed upstream of the axial fan 52 and downstream of the inlet muffler 40 and condition the airflow for improved noise performance.

In an embodiment, the bellmouth 70 can define one or more surface features 1406 extending into the air flow path 22. The surface features 1406 can include, for example, bumps, ridges, protrusions, vanes, dimples, posts, grooves, surface roughness, textures, three dimensional indicia, funnels, castellations, undulations, other surface features, or any combination thereof. The surface features 1406 may enhance noise reduction, for example, by breaking up local noise generating areas and enhancing air flow through the blower 10.

Referring now to FIG. 4, blowers 10 in accordance with the present disclosure may further include damper liners 80. A damper liner 80 may be disposed within the main body 12, such as relatively proximate the outlet end 26 and relatively distal from the inlet end 24. For example, damper liner 80 may be disposed downstream of the outer housing 76 along the airflow path 22. In some embodiments, damper liner 80 may contact a downstream end of the outer housing 76. In some embodiments, a downstream portion of the motor housing 66 may be surrounded by the damper liner 80. Damper liner 80 may, for example, be disposed entirely within the outlet portion 32 or may extend between and within both the inlet portion 30 and outlet portion 32.

Damper liner 80 may have a generally cylindrical shape, and may contact the main body 12. Accordingly, damper liner 80 may further define the airflow path 22. Damper liner 80 may be formed from a suitable damping material, such as in exemplary embodiments a foam or a fiber-based composite or other material, such as a glass-fiber or natural-fiber (such as jute) based composite or other material. In exemplary embodiments, the damping material may be an open cell material, such as an open cell foam. For example, damper liner 80 may be formed from a polyurethane foam, such as in exemplary embodiments an open cell polyurethane foam. In exemplary embodiments, the damper liner 80 and damper material 48 are formed from the same damping material.

In exemplary embodiments, the damper liner 80 may have a thickness 81 of between 6 millimeters and 10 millimeters, such as between 7 millimeters and 9 millimeters, such as 8 millimeters.

In exemplary embodiments, at least one air gap 82, such as a plurality of air gaps 82, may be defined between the damper liner 80 and the main body 12. Each air gap 82 may have a depth 83 (along a radial direction) of between 2 millimeters and 8 millimeters, such as between 3 millimeters and 7 millimeters, such as between 4 millimeters and 6 millimeters, such as 5 millimeters. Each air gap 82 may extend circumferentially between the damper liner 80 and main body 12, and in exemplary embodiments each air gap 82 may be an annular air gap 82 which extends through an entire circumference. The use of air gaps 82 in accordance with the present disclosure advantageously provides further noise reduction and reduces the thickness 81 required for damper liner 80 to be effective in providing suitable noise reduction.

Damper liner 80 advantageously provides significant noise reduction for blowers 10 in accordance with the present disclosure. Such noise reduction is advantageously provided while maintaining the performance of the blower 10. Further, damper liner 80 can be relatively thin and unobstrusive, while providing such advantageous noise reduction.

Figure 7:
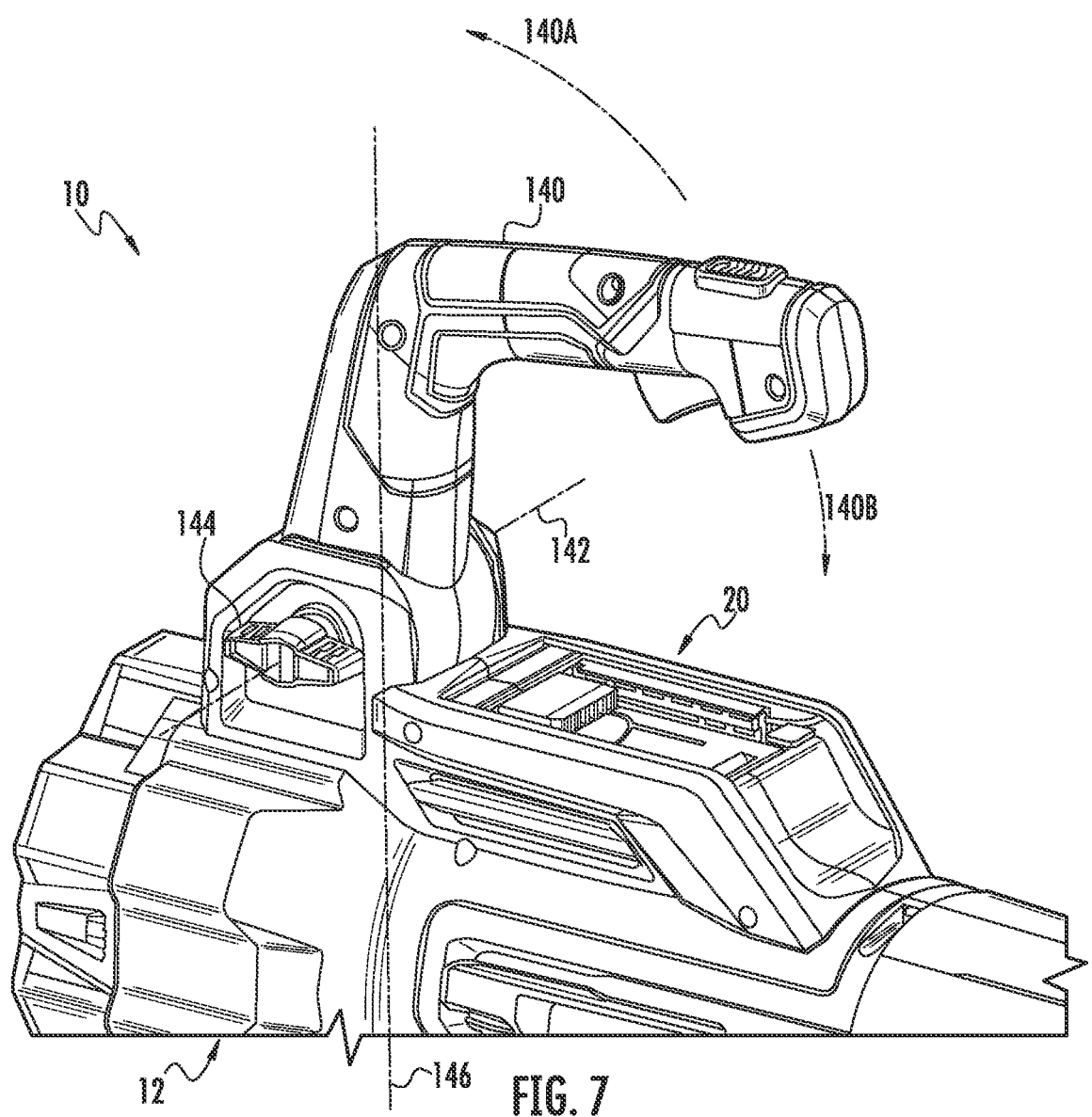
FIG. 7 is a perspective view of a portion of the inlet portion of a blower in accordance with embodiments of the present disclosure.
Figure 8A:
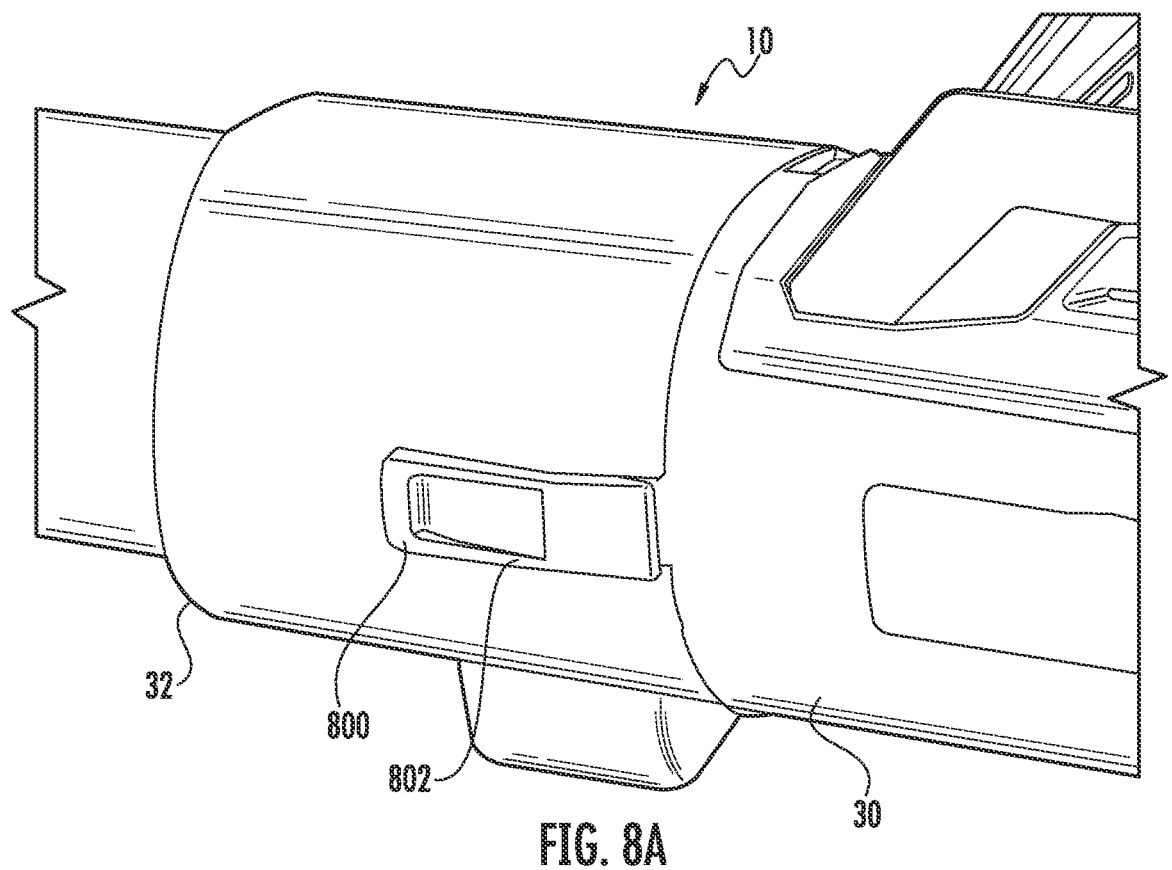
FIGS. 8A and 8B are perspective views of a portion of the main body of a blower in accordance with embodiments of the present disclosure.
Figure 8B:
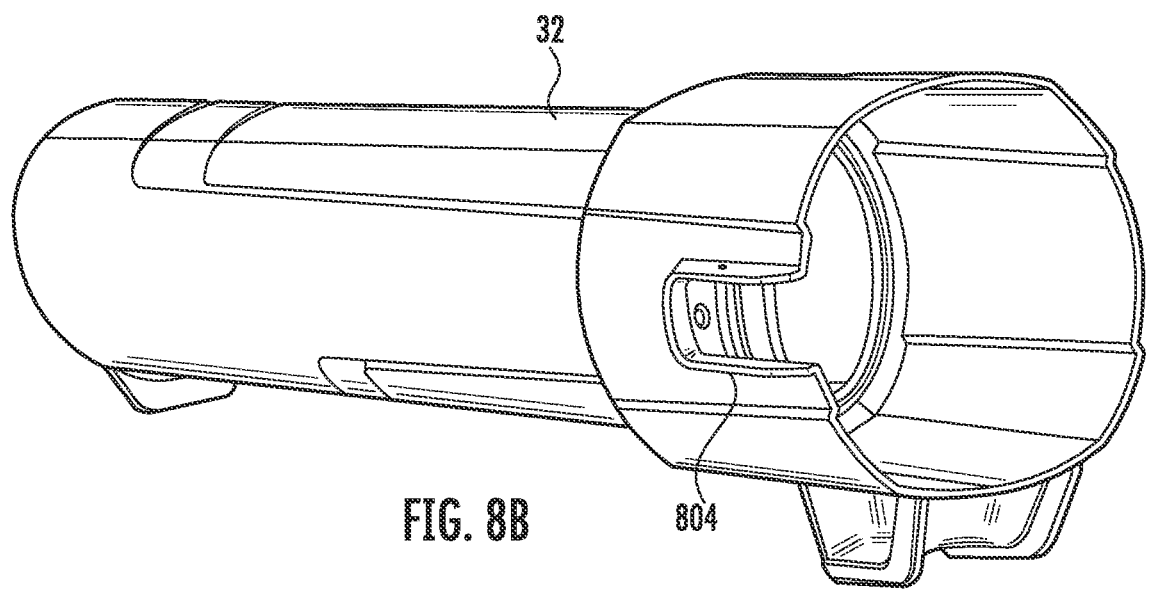

FIG. 7 illustrates an enlarged view of an embodiment of the blower 10 including a handle 140 rotatably coupled to the main body 12 of the blower 10. The handle 140 may be rotatable along a pivot axis 142 in directions 140A and/or 140B. In an embodiment, the handle 140 can be rotatable along the pivot axis 142 by at least 1°, such as at least 5°, such as at least 10°, such as at least 25°, such as at least 45°, such as at least 60°. In another embodiment, the handle 140 can be rotatable along the pivot axis 142 no greater than 360°, such as no greater than 180°, such as no greater than 90°. Through rotatably adjusting the orientation of the handle 140 along the pivot axis 142, the operator may better align the handle 140 for ergonomic use at multiple operating orientations and positions. In one or more embodiments, the blower 10 can define preset rotatable positions, e.g., a discrete number of rotatable stop points along the pivot axis 142, where the handle 142 can be adjusted between. In other embodiments, the handle 140 can be infinitely adjustable, i.e., the handle 140 can be stopped at any suitable rotational orientation within a maximum rotatable path of the handle 140.

In an embodiment, the handle 140 can be selectively secured at a desired angular orientation via a selectable locking mechanism, such as a knob 144, configured to temporarily secure the handle 140 at the desired angular orientation. The knob 144 can include, for example, a winged nut connected to, or integrally formed with, an elongated member extending through the handle 140. Tightening the knob 144 can selectively maintain the handle 140 in the desired angular orientation. In certain instances, the knob 144 can include indicia indicating a direction for tightening and loosening. The knob 144 can include a grippable interface, such as one or more projecting surface(s), pads, or other elements to prevent the operator from slipping during tightening or loosening. In an embodiment, the knob 144, or one or more components associated therewith, can create a tactile indication to the operator when the knob 144 is sufficiently tightened so as to maintain the handle 140 in the desired angular orientation.

In other embodiments, the selectable locking mechanism can include a button fastener, a bayonet-type connection, a latch or lever, a selectable bearing or gearing system, one or more pins extendable into the handle 140, another suitable mechanism known in the art, or any combination thereof. The selectable locking mechanism may include one or more locking features to maintain the locking mechanism in the locked configuration, i.e., the handle 140 is selectively secured at the desired angular orientation.

In certain instances, the blower 10 may be usable with various sized/shaped batteries 18 (FIG. 2) receivable in the battery mount 20. For larger batteries 18, it may be desirable to rotate the handle 140 in the direction of arrow 140A to increase the space between the battery 18 and the operator's hand. For smaller batteries 18, the operator may rotate the handle 140 forward in the direction of arrow 140B. In an embodiment, the different sized batteries 18 can include instruction as to the correct angular orientation of the handle 140 for operating with the battery 18.

In a non-illustrated embodiment, the handle 140 may be rotatable along a different pivot axis than pivot axis 142. For example, the handle 140 may be rotatable along a pivot axis 146. Pivot axis 146 may permit the operator to rotate the handle 140 along a plane parallel, or generally parallel, with a length of the blower 10.

Figure 15:
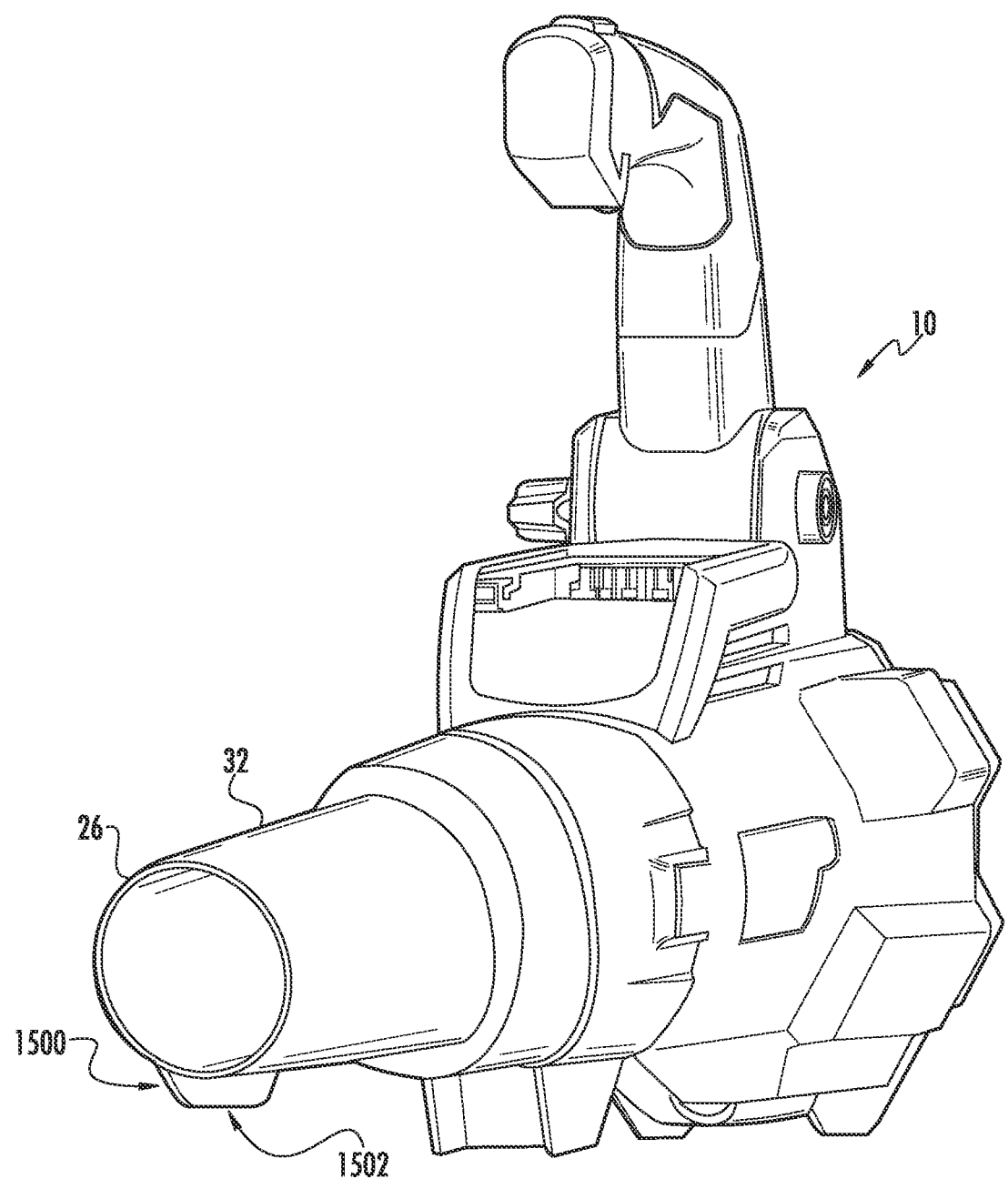
FIG. 15 is a front perspective view of a blower including a leaf scraper in accordance with embodiments of the present disclosure.

Referring to FIG. 15, the blower 10 may include a leaf scraper 1500 disposed at or adjacent to the outlet end 26. The leaf scraper 1500 may extend from the outlet portion 32 of the blower 10 and provide a surface against which an operator can contact leaves and surface debris which may be adhered to the surface, requiring mechanical contact to free. In an embodiment, the leaf scraper 1500 may include a generally planar lip 1502. In a particular embodiment, the lip 1502 may be formed from a relatively rigid material, such as a rigid plastic, metal, or alloy. In another particular embodiment, the lip 1502 may be formed from a relatively pliable material, such as a rubber or soft plastic. As used herein, the terms "rigid" and "pliable" are used with respect to one another with rigid materials generally holding their shape under application of operational biasing pressure and pliable materials deforming under application of operational biasing pressure. In certain instances, rigid lip 1502 may be suitable for applications where the operator wants to scrape an adhered leaf from the ground. In other instances, a pliable lip 1502 may be suitable for applications where the operator wants to access a crevice or crack that the rigid lip 1502 cannot reach. In an embodiment, the leaf scraper 1500 may be removably attached to the blower 10 such that the operator can swap lips 1502 for particular operations. In other embodiments, the leaf scraper 1500 may be adjustable relative to the outlet portion 32, e.g., rotatable, such that the operator can adjust between two different lips 1502 without detaching either lip 1502. In yet another embodiment, the leaf scraper 1500 can include rigid portions and pliable portions fixedly coupled to the blower 10. The operator can select between the rigid and pliable lips 1500 by rotating the blower 10 accordingly. In an embodiment, the leaf scraper 1500 may prevent the outlet end 26 from contacting the ground, e.g., wet leaves, which might foul the outlet portion 32.

Figure 16:
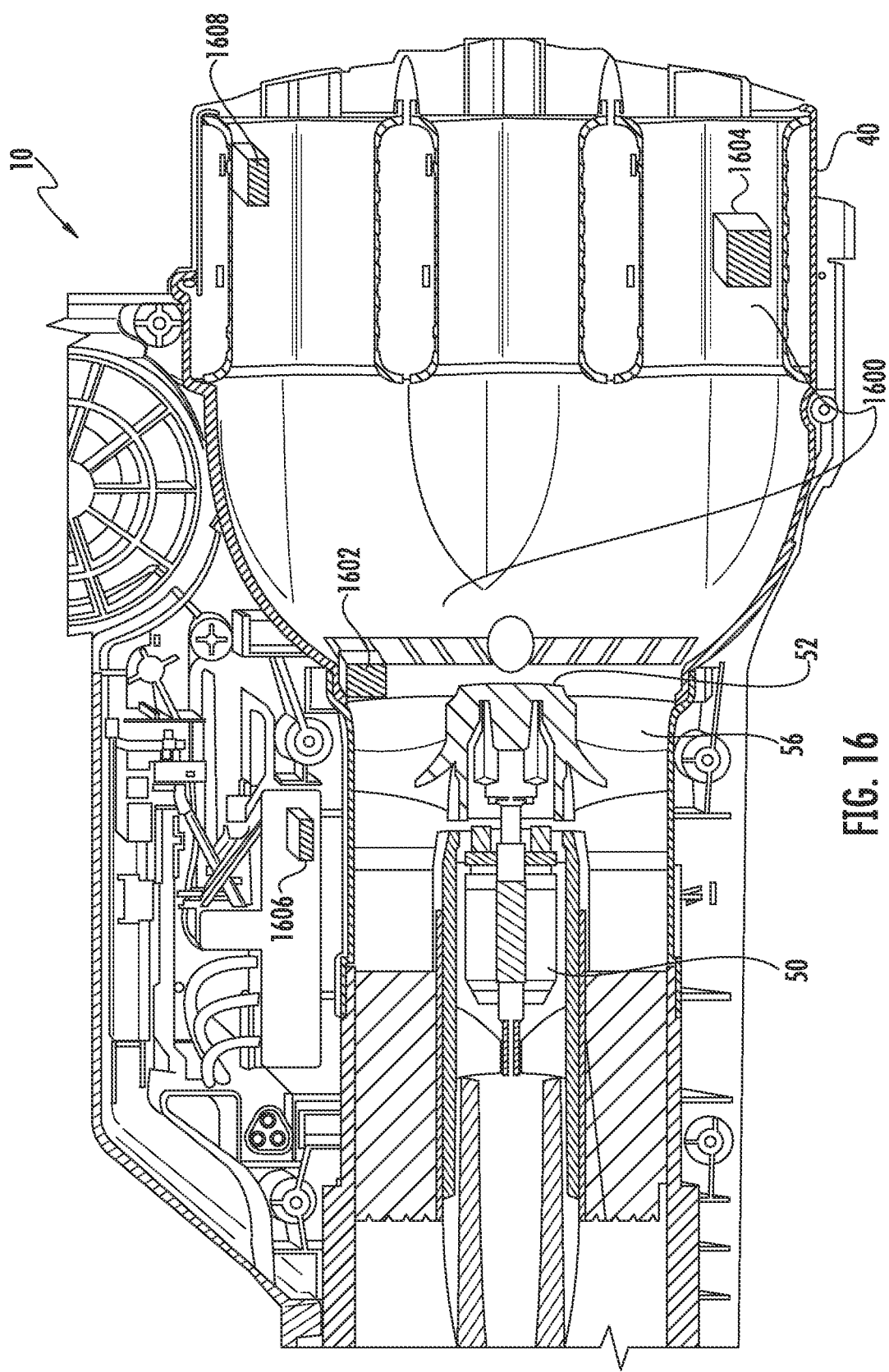
FIG. 16 is a cross-sectional view of a portion of the main body of a blower including a noise cancelling system in accordance with embodiments of the present disclosure.

FIG. 16 includes a schematic of an exemplary noise cancelling system 1600 that may be utilized with the blower 10. Much of the noise generated by equipment, such as blowers, occurs within a known range of audible frequencies formed of relatively known tonal signatures. The noise in blower 10 may be associated with the rotor blades 56, the motor 50, and other components creating drag and air pressure variations within the blower 10. To mitigate and further reduce the noise of the blower 10, the noise cancelling system 1600 may include a microphone 1602 and a sound source 1604, such as a speaker. The noise cancelling system 1600 may further include a controller 1606 configured to control the sound emitted from the sound source 1604 in response to the perceived noise received by microphone 1602.

In an embodiment, the microphone 1602 includes a sensitive audio element configured to sense sound and generate a representative electrical signal thereof. The microphone 1602 may be located anywhere on the blower 10, but in a particular embodiment is disposed near the axial fan 52 since a majority of the noise of the blower 10 is created by the axial fan 52 and elements associated with the motor 50.

The controller 1606 can be configured to receive the representative electrical signal of the noise from the microphone 1602. Based on this signal, the controller 1606 can generate a second electrical signal indicative of a noise-cancelling signal. This operation may be performed in accordance with a number of well-known audio techniques.

In a particular embodiment, the second electrical signal can be determined, for example, using adaptive finite impulse response filters.

In an embodiment, the sound source 1604 may be disposed near the inlet muffler 40, such as along or adjacent to an inner surface of the inlet muffler 40. The sound source 1604 may be configured to generate sound relating to the audible noise-cancelling signal to mitigate the noise created by the blower 10. For example, the sound source 1604 may generate an out of phase signal, e.g., a signal 180° out of phase with the noise detected by the microphone 1602. The noise-cancelling signal may emanate from the blower 10 and mitigate the noise level detected by the operator and those nearby.

If further sound dampening is desired, the noise cancelling system 1600 may further include an error sensor 1608, such as a secondary microphone, configured to detect sound and generate a third electrical signal representing the sound detected by the error sensor 1608. The third electrical signal can communicate with the controller 1606 to further dampen the noise generated by the blower 10.

Figure 19A:
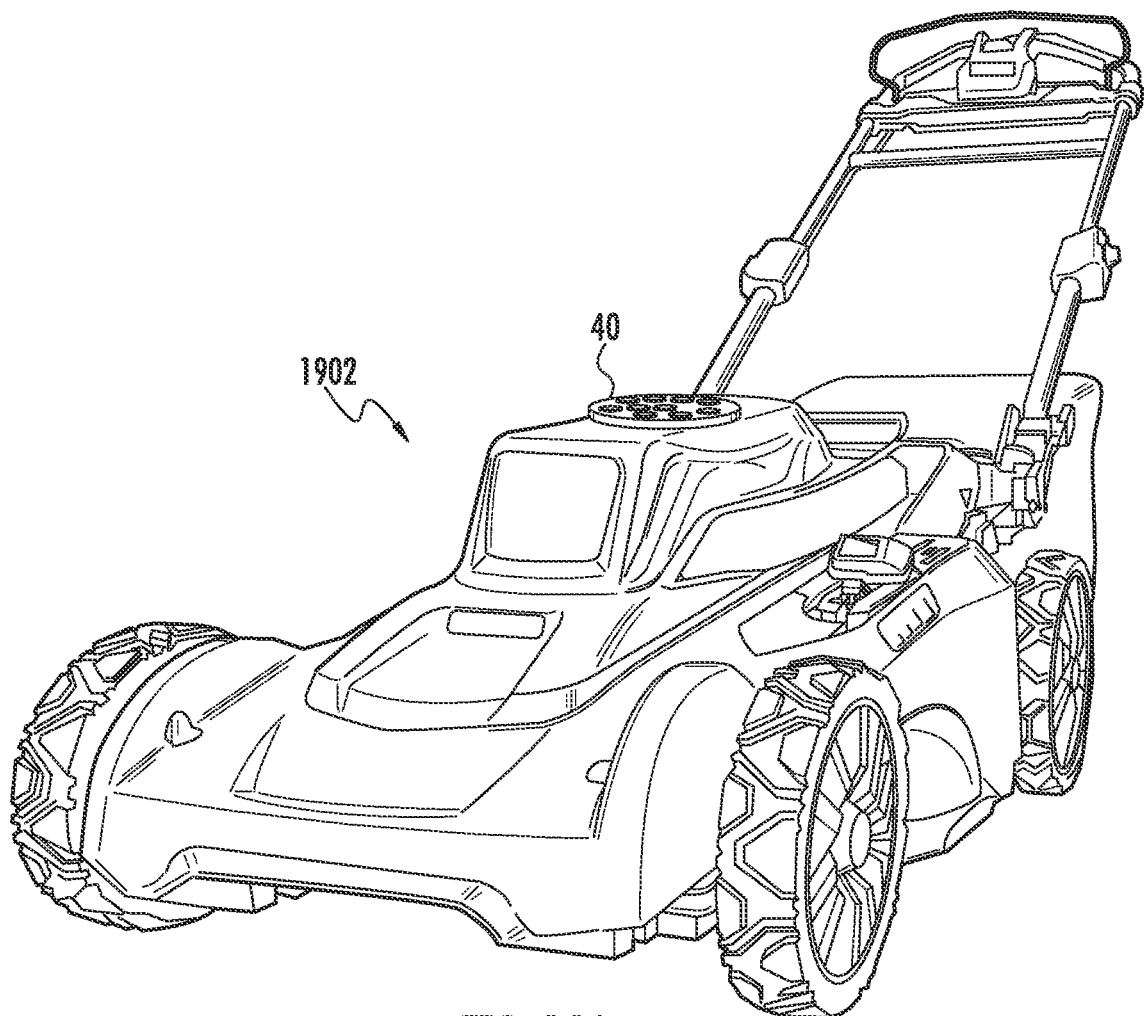
FIGS. 19A to 19G are perspective views of different power tools including inlet mufflers in accordance with embodiments of the present disclosure.
Figure 19B:
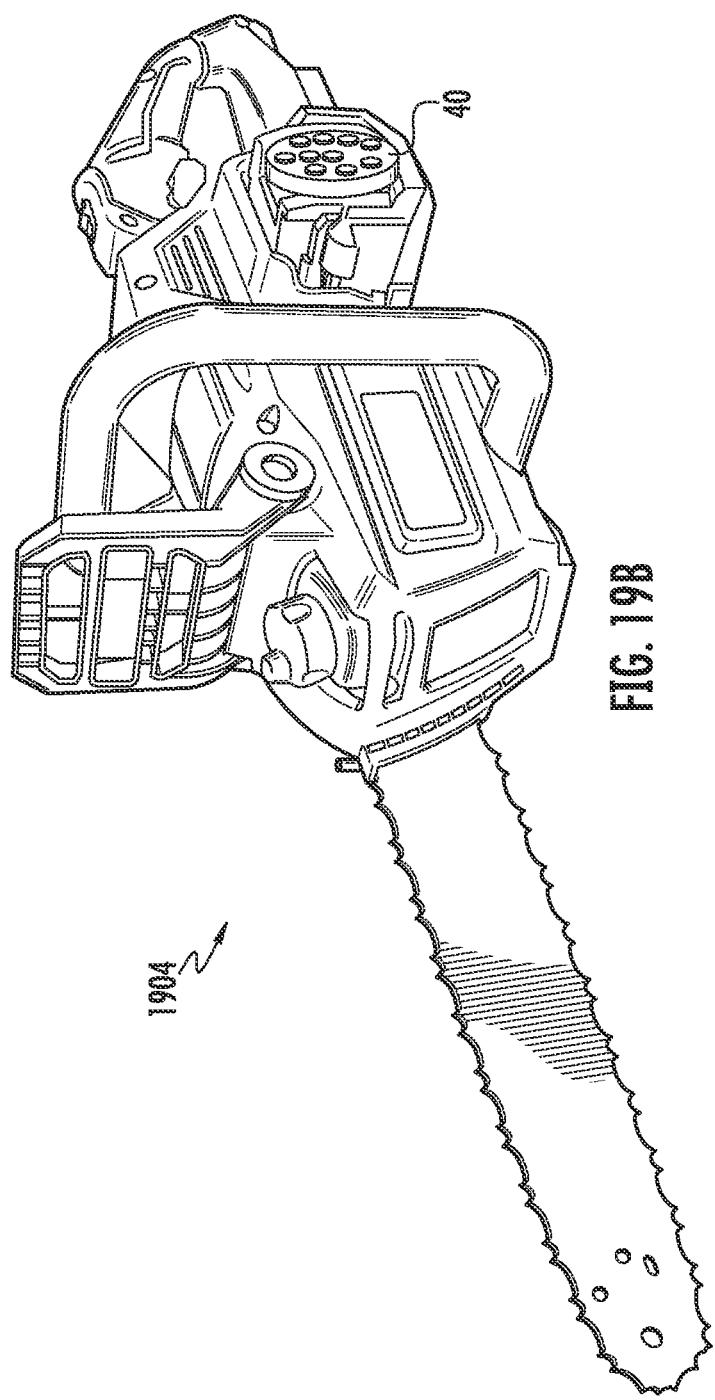
Figure 19C:
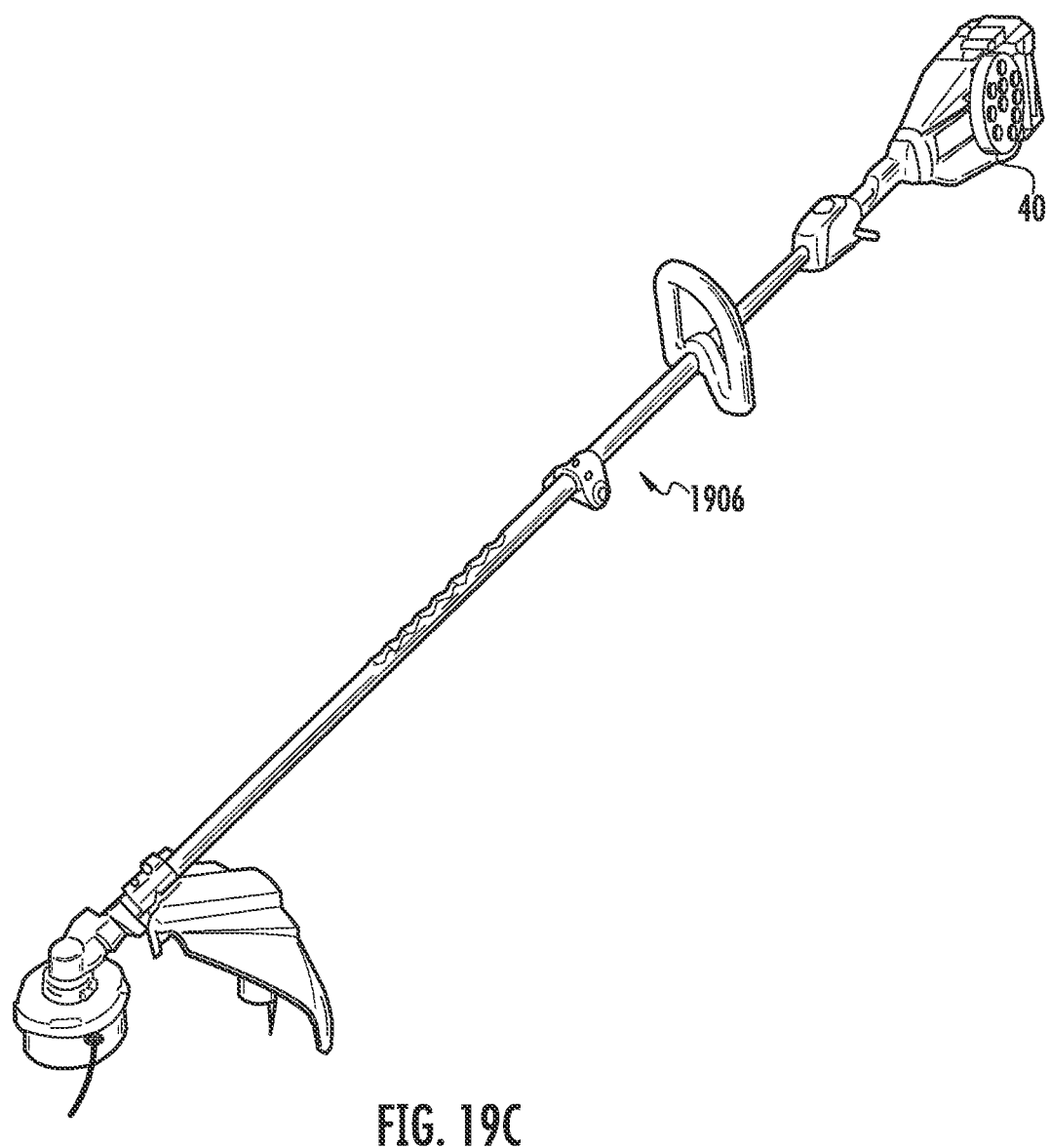
Figure 19D:
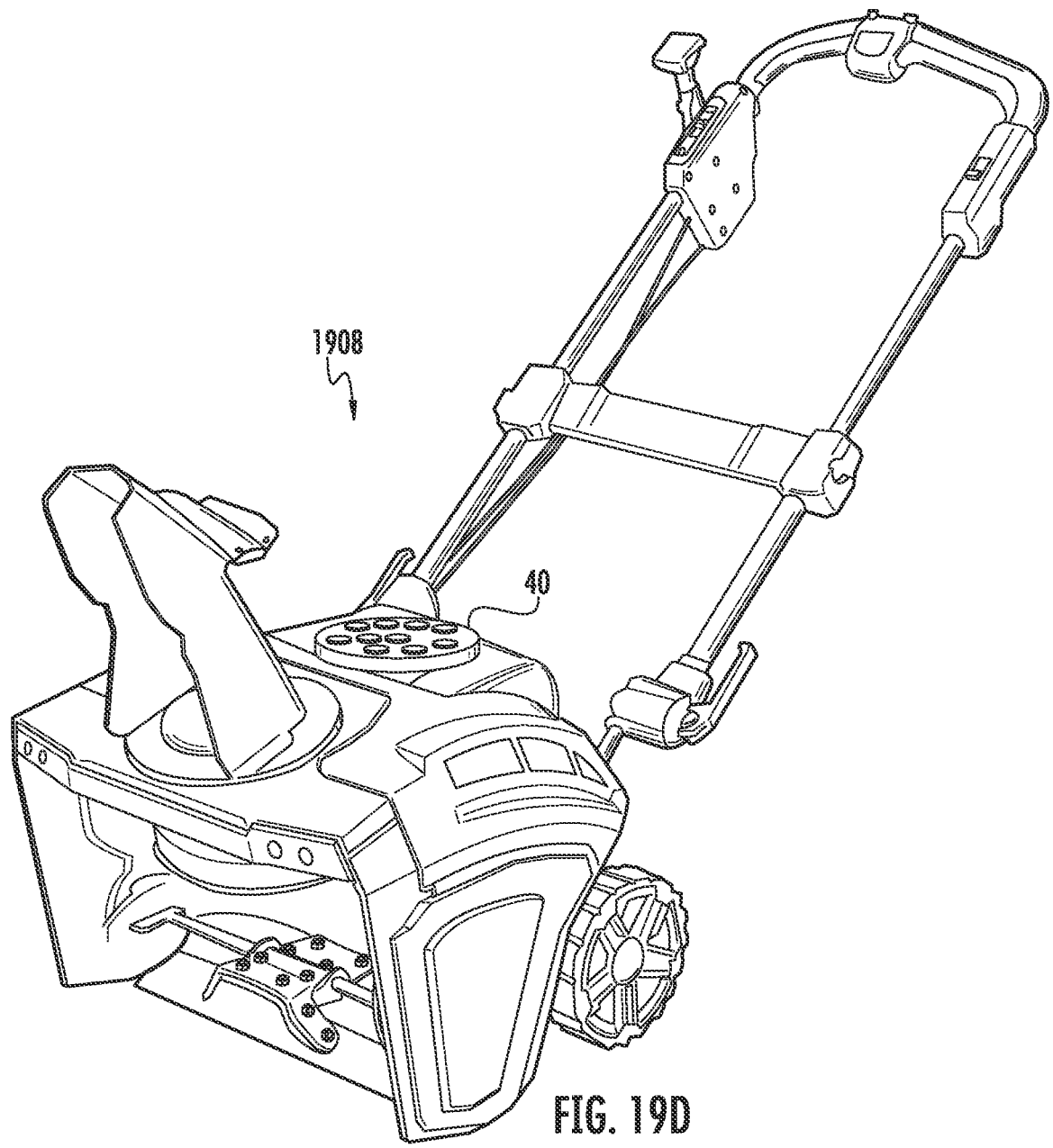
Figure 19E:
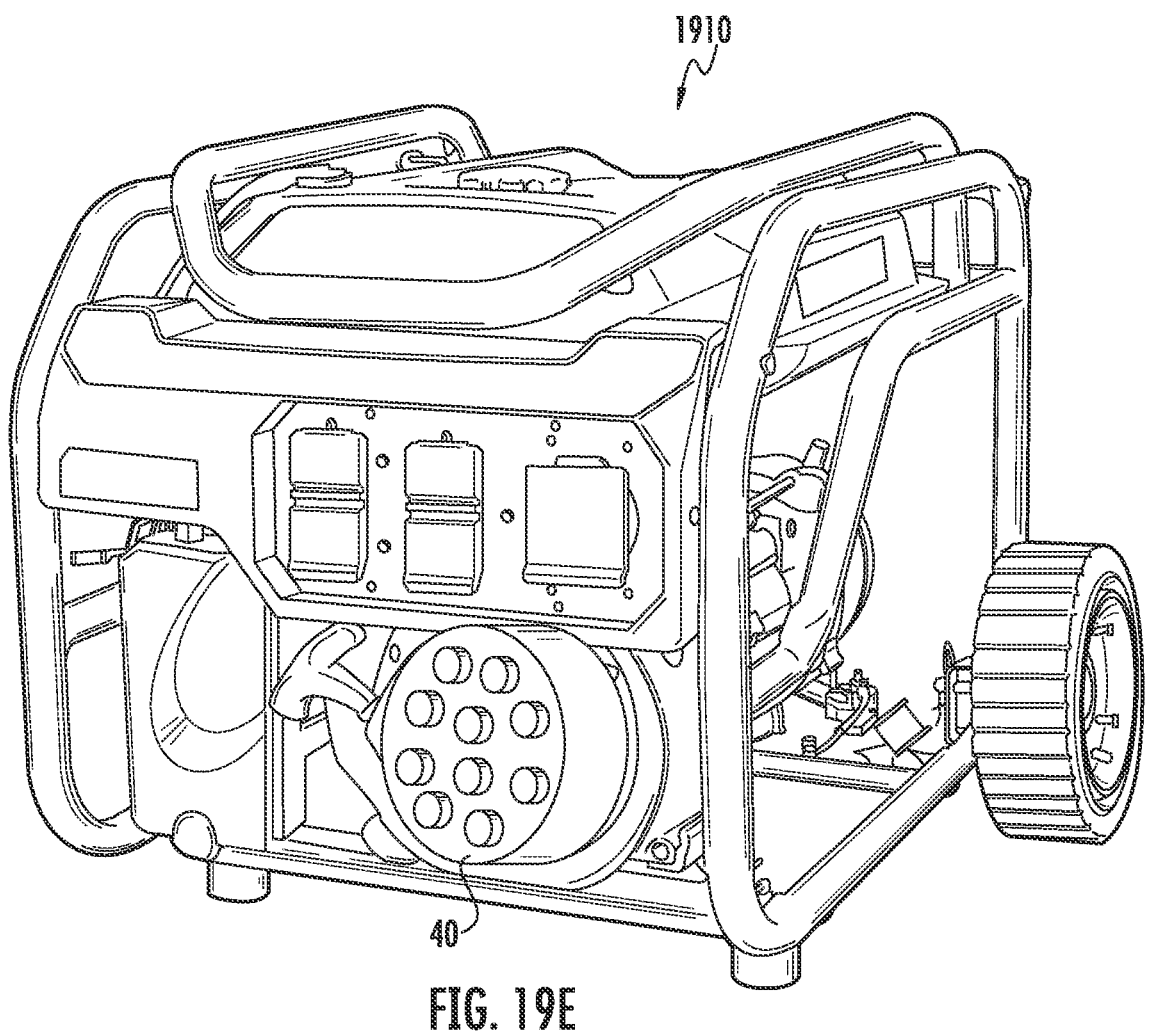
Figure 19F:
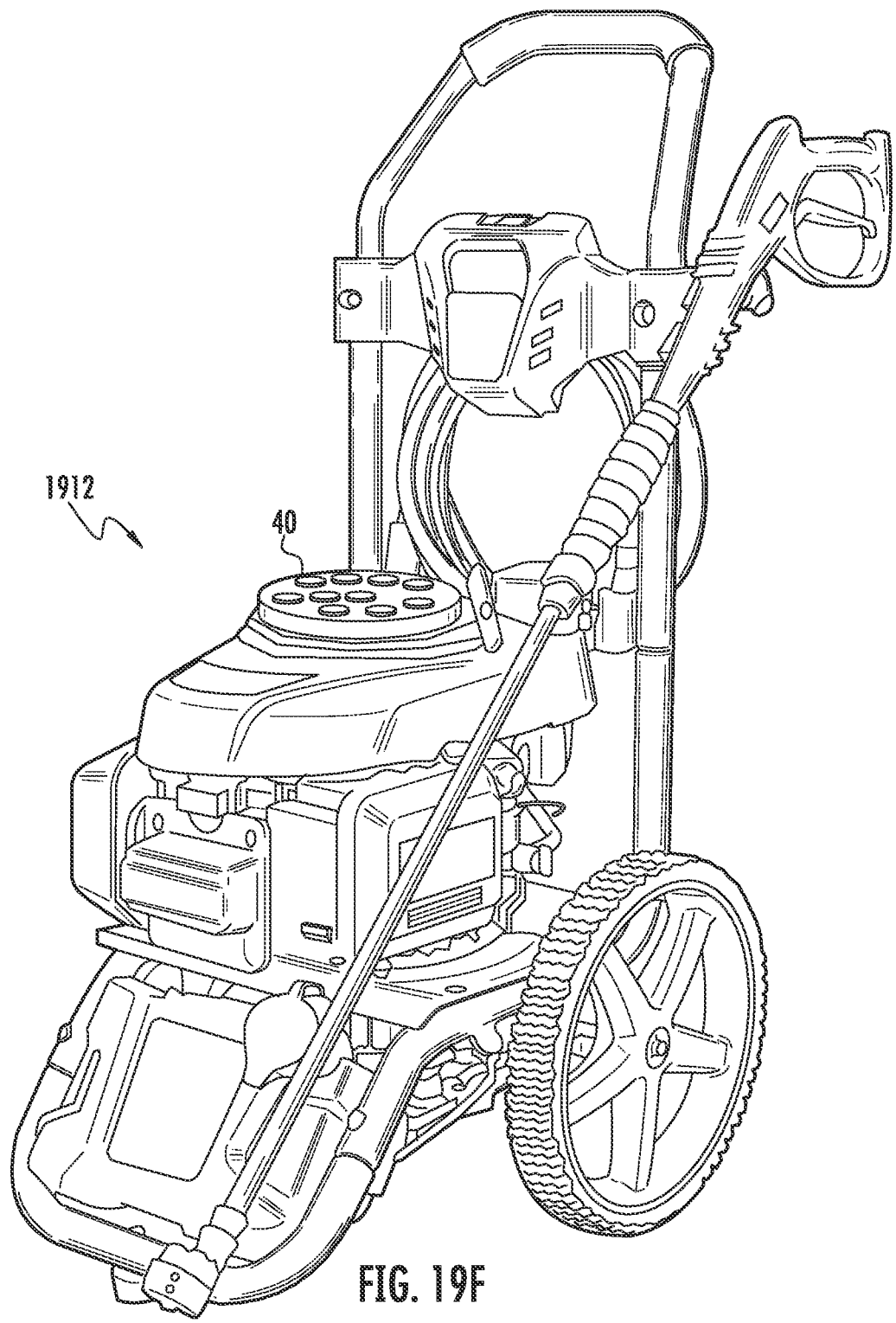
Figure 19G:
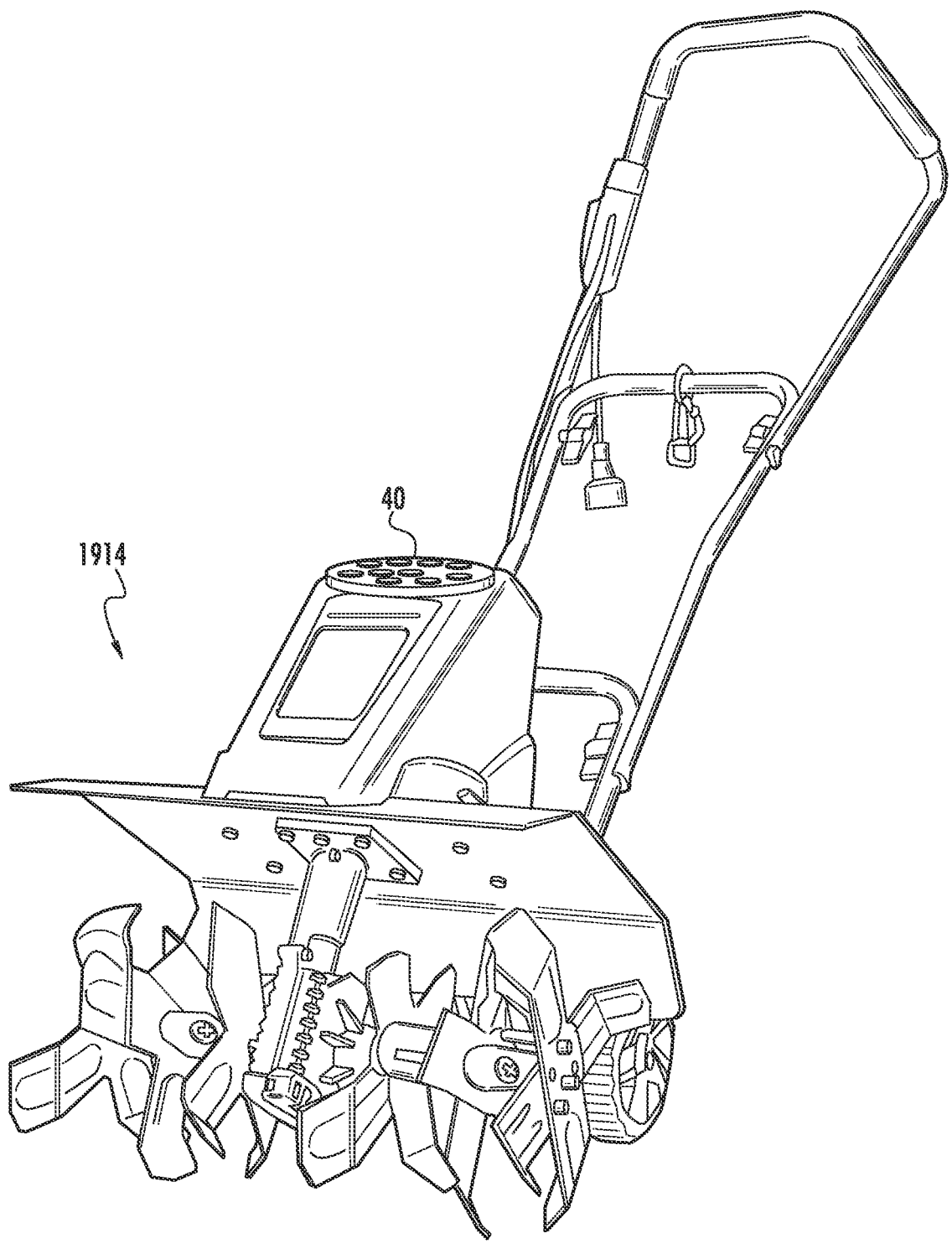

FIGS. 19A to 19G include views of exemplary power tools including inlet mufflers 40 in accordance with one or more embodiments previously described herein. The exemplary power tools include a lawn mower 1902 (FIG. 19A), a chain saw 1904 (FIG. 19B), a trimmer 1906 (FIG. 19C), a snow blower 1908 (FIG. 19D), a generator 1910 (FIG. 19E), a pressure washer 1912 (FIG. 19F), and a tiller 1914 (FIG. 19G). The embodiments illustrated in FIGS. 19A through 19G are exemplary only. Other power tools can include inlet mufflers 40 in accordance with embodiments described herein.

Figure 20:
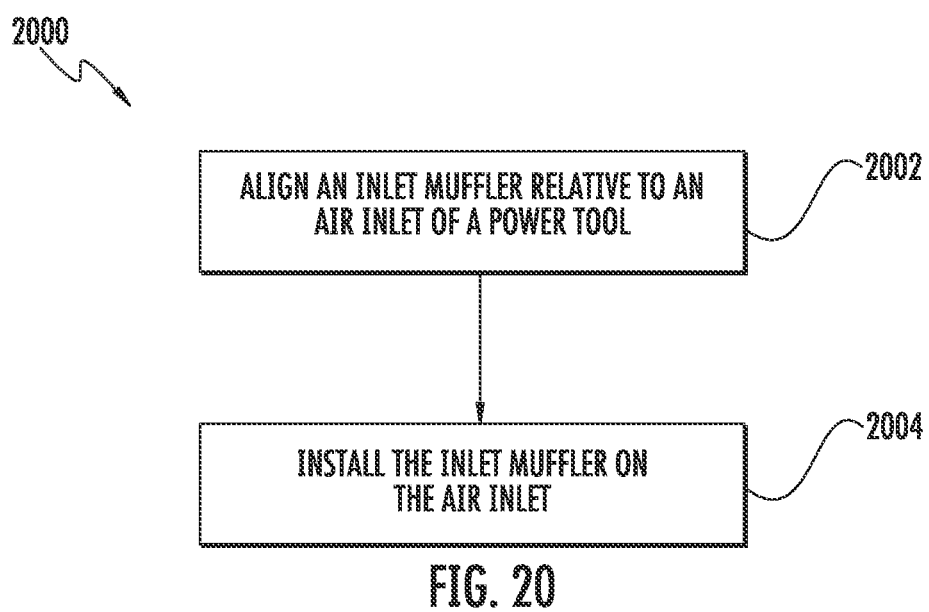
FIG. 20 includes a flow chart of a method of dampening a power tool in accordance with embodiments of the present disclosure.

FIG. 20 illustrates an exemplary flow chart of a method 2000 of dampening a power tool. The method 2000 can include a step 2002 of aligning an inlet muffler relative to an air inlet of a power tool. The method 2000 can further include a step 2004 of installing the inlet muffler on the air inlet. The inlet muffler can include a plurality of inlet ports. Each of the plurality of inlet ports can include a peripheral surface defining a port aperture therethrough. At least one of the plurality of inlet ports can further include a damper material provided on the peripheral surface of the at least one inlet port and further defining the port aperture therethrough. Installation of the inlet muffler can be performed by coupling the inlet muffler to the air inlet of the power tool. In certain instances, the inlet muffler can be permanently coupled to the air inlet. In other instances, the inlet muffler can be temporarily coupled to the air inlet. In such a manner, an operator can change, adjust, or otherwise manipulate the inlet muffler.

In an embodiment, the method 2000 can further include a step of assembling at least one of the plurality of inlet ports prior to installing the inlet muffler on the air inlet at step 2004. The step of assembling the at least one inlet port can include installing a damper material over a framework. The framework can define an inner surface of the inlet port. The framework can further define a plurality of openings extending radially outward such that the damper material is in fluid communication with airflow through the air inlet. The damper material can include an axially extending split. An inner circumference of the damper material can expand when the damper material is installed over the framework, i.e., the axial split can circumferentially expand to accommodate the framework. In an embodiment, the method 2000 can further include a step of attaching a plurality of inlet ports together to form the inlet muffler. This step can be performed after assembling the at least one of the plurality of inlet ports. The step of attaching the plurality of inlet ports together can be performed prior to aligning the inlet muffler at step 2002.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power tool comprising:
an air inlet; and
an inlet muffler disposed within the air inlet, the inlet muffler comprising:
a plurality of inlet ports, each of the plurality of inlet ports comprising a peripheral surface;
a damper material provided on the peripheral surface of at least one of the plurality of inlet ports and further defining a port aperture therethrough,
wherein the plurality of inlet ports comprises:
a central inlet port disposed along a longitudinal axis of the power tool, and
a plurality of surrounding inlet ports disposed around the central inlet port.

2. The power tool of claim 1, wherein the surrounding inlet ports lie along a circular arc extending equidistant around the central inlet port.

3. The power tool of claim 1, wherein at least one of the plurality of inlet ports comprises:
a framework including a body extending between a first axial end and a second axial end of the air inlet, the body defining one or more openings through a radial surface thereof; and
a damper material disposed around the framework and in communication with air passing through the air inlet port through the one or more openings.

4. The power tool of claim 1, wherein at least one of the plurality of inlet ports is angled relative to another one of the plurality of inlet ports.

5. The power tool of claim 3, wherein the body of the framework comprises an axially extending split.

6. The power tool of claim 1, wherein the central inlet port has a different size than the surrounding inlet ports.

7. The power tool of claim 3, wherein the one or more openings define a damper material exposure ratio [$A_O/SA_B$], as measured by a combined area, $A_O$, of all of the openings relative to a surface area, $SA_B$, of the body of the framework, of at least 0.2.

8. The power tool of claim 1, wherein the inlet muffler is detachable from a body of the power tool.

9. The power tool of claim 1, wherein the damper material is removably attached to the inlet muffler by a retaining structure.

10. The power tool of claim 1, wherein the plurality of inlet ports defines an airflow path, and wherein the inlet muffler further comprises a plurality of auxiliary openings each defining an auxiliary airflow path angularly offset from the airflow path.

11. The power tool of claim 1, wherein the power tool comprises a lawn mower, a compressor, an inflator, a forced air heater, a pump, a fluid pump, a generator, a snow blower, a pressure washer, a chain saw, an edger, a trimmer, or a vacuum.

12. The power tool of claim 1, wherein the power tool has a muffled sound intensity, $dB_M$, as measured when the power tool is equipped with the inlet muffler, a non-muffled sound intensity, $dB_U$, as measured when the power tool is not equipped with the inlet muffler, a maximum muffled operational power capacity, $P_M$, as measured when the power tool is equipped with the inlet muffler, and a non-muffled operational power capacity, $P_U$, as measured when the power tool is not equipped with the inlet muffler, the power tool comprising:
    an operational power to dampening loss ratio $[P_M/P_U/dB_M/dB_U]$ of at least 1.25.

13. The power tool of claim 12, wherein the inlet muffler defines an airflow ratio $[AF_P/AF_T]$, as measured by a ratio of a cross-sectional area of the inlet muffler through which airflow can pass unrestricted, $AF_P$, relative to the total cross-sectional area of the inlet muffler, $AF_T$, no less than 0.8.

14. An outdoor power tool comprising an operational power to dampening loss ratio $[P_M/P_U/dB_M/dB_U]$ of at least 1.25, where $dB_M$ is a muffled sound intensity of the outdoor power tool when equipped with an air inlet muffler, where $dB_U$ is a non-muffled sound intensity of the outdoor power tool when not equipped with the air inlet muffler, where $P_M$ is a maximum muffled operational power capacity of the outdoor power tool when equipped with the air inlet muffler, and where $P_U$ is a non-muffled operational power capacity of the outdoor power tool when not equipped with the air inlet muffler, wherein the air inlet muffler comprises a damper material provided on a peripheral surface of at least one of a plurality of inlet ports of the air inlet muffler, and wherein the plurality of inlet ports comprise a central inlet port disposed along a longitudinal axis of the outdoor power tool and a plurality of surrounding inlet poers disposed around the central inlet port.

15. The outdoor power tool of claim 14, wherein the air inlet muffler is disposed upstream of a noise source of the outdoor power tool, the air inlet muffler comprising:
    a plurality of inlet ports, at least one of the plurality of inlet ports comprising:
        a framework including a body extending between a first axial end and a second axial end of the inlet port, the body defining one or more openings through a radial surface thereof,
        wherein the damper material is disposed around the framework and in communication with air passing through the inlet port through the one or more openings.

16. The outdoor power tool of claim 15, wherein the air inlet muffler defines an airflow ratio $[-AF_P/AF_T]$, as measured by a ratio of a cross-sectional area of the air inlet muffler through which airflow can pass unrestricted, $AF_P$, relative to the total cross-sectional area of the air inlet muffler, $AF_T$, no less than 0.8.

17. The outdoor power tool of claim 14, wherein the outdoor power tool comprises a lawn mower, a compressor, an inflator, a forced air heater, a pump, a fluid pump, a generator, a snow blower, a pressure washer, a chain saw, an edger, a trimmer, or a vacuum.

18. A method of dampening a power tool, the method comprising:
    aligning an inlet muffler relative to an air inlet of the power tool; and
    installing the inlet muffler on the air inlet, the inlet muffler comprising:
        a plurality of inlet ports, each of the plurality of inlet ports comprising a peripheral suface;
        a damper material provided on the peripheral surface of at least one of the plurality of inlet ports and further defining a port aperture therethrough,
        wherein the plurality of inlet ports comprises a central inlet port disposed along a longitudinal axis of the power tool and surrounding inlet ports disposed around the central inlet port.

19. The method of claim 18, further comprising:
assembling at least one of the plurality of inlet ports prior to installing the inlet muffler on the air inlet, the step of assembling the at least one inlet port including installing a damper material over a framework, wherein an inner circumference of the damper material expands when installed over the framework.

20. The method of claim 19, further comprising:
attaching a plurality of inlet ports together to form the inlet muffler after assembling the at least one of the plurality of inlet ports.

* * * * *